(12) United States Patent
He et al.

(10) Patent No.: US 11,838,181 B2
(45) Date of Patent: Dec. 5, 2023

(54) FLEXIBLE ETHERNET GROUP MANAGEMENT METHOD, DEVICE, AND COMPUTER-READABLE STORAGE MEDIUM

(71) Applicant: Huawei Technologies Co., Ltd., Shenzhen (CN)

(72) Inventors: Xiang He, Beijing (CN); Hongliang Sun, Shenzhen (CN); Dawei Fan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/831,158

(22) Filed: Jun. 2, 2022

(65) Prior Publication Data

US 2022/0337477 A1 Oct. 20, 2022

Related U.S. Application Data

(63) Continuation of application No. PCT/CN2020/119066, filed on Sep. 29, 2020.

(30) Foreign Application Priority Data

Dec. 6, 2019 (CN) .......................... 201911244655.2
Dec. 31, 2019 (CN) .......................... 201911412030.2

(51) Int. Cl.
*G06F 15/177* (2006.01)
*H04L 41/084* (2022.01)
*H04L 41/0893* (2022.01)

(52) U.S. Cl.
CPC ........ *H04L 41/084* (2013.01); *H04L 41/0893* (2013.01)

(58) Field of Classification Search
CPC .................................. H04J 3/00; H04L 12/50
See application file for complete search history.

(56) References Cited

U.S. PATENT DOCUMENTS

2017/0006360 A1  1/2017  Gareau
2019/0173856 A1  6/2019  Gareau et al.
(Continued)

FOREIGN PATENT DOCUMENTS

CN  108243120 A  7/2018
CN  108632061 A  10/2018
(Continued)

OTHER PUBLICATIONS

IA OIF FLEXE-02.1, IA Flex Ethernet 2.1 Implementation Agreement, 56 pages.
(Continued)

*Primary Examiner* — Wing F Chan
*Assistant Examiner* — Joseph R Maniwang
(74) *Attorney, Agent, or Firm* — Conley Rose, P.C.

(57) ABSTRACT

A first network device determines configuration information of a target flexible Ethernet (FlexE) group to be adjusted, and adjusts the target FlexE group synchronously with a second network device based on the configuration information of the target FlexE group. The second network device communicates with the first network device through a physical layer link in the target FlexE group. The configuration information of the target FlexE group includes a backup FlexE group number and a backup FlexE map of the target FlexE group, and the backup FlexE map includes information about the physical layer link in the target FlexE group. The first network device and the second network device perform synchronous adjustment.

20 Claims, 15 Drawing Sheets

(56) References Cited

U.S. PATENT DOCUMENTS

2019/0349311 A1    11/2019  Ji et al.
2020/0322077 A1*   10/2020  Du .......................... H04L 49/20
2021/0273854 A1*    9/2021  Zhan ................... H04L 43/0864

FOREIGN PATENT DOCUMENTS

| CN | 109688016 A | 4/2019 |
|---|---|---|
| CN | 109981208 A | 7/2019 |
| EP | 3706367 A1 | 9/2020 |
| EP | 3917081 A1 | 12/2021 |
| WO | 2019128467 A1 | 7/2019 |

OTHER PUBLICATIONS

IA OIF-FLEXE-01.0, "Flex Ethernet Implementation Agreement," Mar. 2016, 31 pages.

IA OIF-FLEXE-02.0, "Flex Ethernet 2.0 Implementation Agreement," Jun. 22, 2018, 51 pages.

Y. Jiang et al., "Problem Statements of FlexE Interface Management," draft-jiang-ccamp-flexe-ifmps-00, Nov. 4, 2019, 11 pages.

IEEE Std 802.Mar. 2018, "IEEE Standard for Ethernet," LAN/MAN Standards Committee of the, IEEE Computer Society, Jun. 14, 2018, 5600 pages.

IA OIF-FLEXE-01.1, Flex Ethernet Implementation Agreement, Jun. 21, 2017, 35 pages.

IA OIF-FLEXE-02.2, FlexE 2.2 Implementation Agreement, Oct. 2021, 61 pages.

\* cited by examiner

US 11,838,181 B2

FLEXIBLE ETHERNET GROUP MANAGEMENT METHOD, DEVICE, AND COMPUTER-READABLE STORAGE MEDIUM

CROSS-REFERENCE TO RELATED APPLICATIONS

This application is a continuation of International Patent Application No. PCT/CN2020/119066, filed on Sep. 29, 2020, which claims priority to Chinese Patent Application No. 201911244655.2, filed on Dec. 6, 2019 and Chinese Patent Application No. 201911412030.2 filed Dec. 31, 2019. All of the aforementioned applications are hereby incorporated by reference in their entireties.

TECHNICAL FIELD

The present disclosure relates to the field of communications technologies, and in particular, to a flexible Ethernet group management method, a device, and a computer-readable storage medium.

BACKGROUND

Current Ethernet interface standards specify fixed rates. Therefore, for the purpose of meeting a requirement for a higher bandwidth, an adaptation layer between a media access control (MAC) layer and a physical coding sublayer (PCS) is created by using a Flexible Ethernet (FlexE) technology, so that an Ethernet interface rate can be flexibly applicable to a plurality of service scenarios.

A basic function of the FlexE technology is to map, based on a time-division multiplexing (TDM) mechanism of a FlexE shim, service flows of M FlexE clients to a FlexE group including N physical layer (PHY) links. Both M and N are positive integers.

SUMMARY

Embodiments of the present disclosure provide a flexible Ethernet group management method, a device, and a computer-readable storage medium, to adjust a flexible Ethernet group without affecting a service.

According to a first aspect, a flexible Ethernet group management method is provided. The method is applied to a first network device. The first network device determines configuration information of a target flexible Ethernet group to be adjusted, and adjusts the target flexible Ethernet group synchronously with a second network device based on the configuration information of the target flexible Ethernet group, where the second network device communicates with the first network device through a physical layer link in the target flexible Ethernet group. The configuration information of the target flexible Ethernet group includes but is not limited to a backup flexible Ethernet group number and a backup flexible Ethernet map of the target flexible Ethernet group, and the backup flexible Ethernet map includes information about the physical layer link in the target flexible Ethernet group.

The target flexible Ethernet group is adjusted synchronously with the second network device, to implement lossless and dynamic adjustment to the FlexE group. This not only can avoid impact on a service, but also can implement Ethernet group adjustment in various scenarios.

In an example embodiment, that the first network device determines configuration information of a target flexible Ethernet group to be adjusted includes: The first network device negotiates, with the second network device through an overhead block, the configuration information of the target flexible Ethernet group to be adjusted. The overhead block carries the configuration information of the target flexible Ethernet group.

In an example embodiment, a reserved bit field of the overhead block carries the configuration information of the target flexible Ethernet group, or a management channel field of the overhead block carries the configuration information of the target flexible Ethernet group.

In an example embodiment, that the first network device determines configuration information of a target flexible Ethernet group to be adjusted includes: The first network device receives the configuration information that is sent by a controller to the first network device and the second network device and that is of the target flexible Ethernet group to be adjusted.

In an example embodiment, after the first network device determines the configuration information of the target flexible Ethernet group to be adjusted, the method further includes: When a new physical layer link is to be added to the target flexible Ethernet group, if the backup flexible Ethernet map includes information about the new physical layer link, the first network device determines that the new physical layer link is valid. In response to a fact that the new physical layer link is valid, the first network device performs the operation of adjusting the target flexible Ethernet group synchronously with the second network device based on the configuration information of the target flexible Ethernet group.

In an example embodiment, after the first network device determines the configuration information of the target flexible Ethernet group to be adjusted, the method further includes: When a target physical layer link in the target flexible Ethernet group is to be deleted, if the backup flexible Ethernet map does not include information about the target physical layer link, the first network device determines that a target flexible Ethernet group obtained after the target physical layer link is deleted can support current traffic. In response to a fact that the target flexible Ethernet group obtained after the target physical layer link is deleted can support the current traffic, the first network device performs the operation of adjusting the target flexible Ethernet group synchronously with the second network device based on the configuration information of the target flexible Ethernet group.

In an example embodiment, after the first network device determines the configuration information of the target flexible Ethernet group to be adjusted, the method further includes: When physical layer links in the target flexible Ethernet group is to be regrouped, if the backup flexible Ethernet group number includes a group number of a regrouped flexible Ethernet group and the backup flexible Ethernet map includes information about a regrouped physical layer link, the first network device determines that the regrouped flexible Ethernet group can support a corresponding service flow. In response to a fact that the regrouped flexible Ethernet group can support the corresponding service flow, the first network device performs the operation of adjusting the target flexible Ethernet group synchronously with the second network device based on the configuration information of the target flexible Ethernet group.

In an example embodiment, that the first network device adjusts the target flexible Ethernet group synchronously with a second network device based on the configuration information of the target flexible Ethernet group includes: The first network device negotiates an adjustment time with the second network device. When the adjustment time arrives, the first network device adjusts the target flexible Ethernet group synchronously with the second network device based on the configuration information of the target flexible Ethernet group.

According to a second aspect, a flexible Ethernet group management method is provided. The method includes: A second network device determines configuration information of a target flexible Ethernet group to be adjusted. The configuration information of the target flexible Ethernet group includes a backup flexible Ethernet group number and a backup flexible Ethernet map of the target flexible Ethernet group, and the backup flexible Ethernet map includes information about a physical layer link in the target flexible Ethernet group. The second network device adjusts the target flexible Ethernet group synchronously with a first network device based on the configuration information of the target flexible Ethernet group, where the first network device communicates with the second network device through the physical layer link in the target flexible Ethernet group.

In an example embodiment, that the second network device determines configuration information of a target flexible Ethernet group to be adjusted includes: The second network device negotiates, with the first network device through an overhead block, the configuration information of the target flexible Ethernet group to be adjusted. The overhead block carries the configuration information of the target flexible Ethernet group.

In an example embodiment, a reserved bit field of the overhead block carries the configuration information of the target flexible Ethernet group, or a management channel field of the overhead block carries the configuration information of the target flexible Ethernet group.

In an example embodiment, that the second network device determines configuration information of a target flexible Ethernet group to be adjusted includes: The second network device receives the configuration information that is sent by a controller to the second network device and the first network device and that is of the target flexible Ethernet group to be adjusted.

In an example embodiment, that the second network device adjusts the target flexible Ethernet group synchronously with a first network device based on the configuration information of the target flexible Ethernet group includes: The second network device negotiates an adjustment time with the first network device. When the adjustment time arrives, the second network device adjusts the target flexible Ethernet group synchronously with the first network device based on the configuration information of the target flexible Ethernet group.

According to a third aspect, a flexible Ethernet group management apparatus is provided. The apparatus is used in a first network device, and the apparatus includes: a determining module configured to determine configuration information of a target flexible Ethernet group to be adjusted, where the configuration information of the target flexible Ethernet group includes a backup flexible Ethernet group number and a backup flexible Ethernet map of the target flexible Ethernet group, and the backup flexible Ethernet map includes information about a physical layer link in the target flexible Ethernet group; and an adjustment module configured to adjust the target flexible Ethernet group synchronously with a second network device based on the configuration information of the target flexible Ethernet group, where the second network device communicates with the first network device through the physical layer link in the target flexible Ethernet group.

In an example embodiment, the determining module is configured to negotiate, with the second network device through an overhead block, the configuration information of the target flexible Ethernet group to be adjusted. The overhead block carries the configuration information of the target flexible Ethernet group.

In an example embodiment, a reserved bit field of the overhead block carries the configuration information of the target flexible Ethernet group, or a management channel field of the overhead block carries the configuration information of the target flexible Ethernet group.

In an example embodiment, the determining module is configured to receive the configuration information that is sent by a controller to the first network device and the second network device and that is of the target flexible Ethernet group to be adjusted.

In an example embodiment, the determining module is further configured to: when a new physical layer link is to be added to the target flexible Ethernet group, if the backup flexible Ethernet map includes information about the new physical layer link, determine that the new physical layer link is valid.

The adjustment module is configured to: in response to a fact that the new physical layer link is valid, perform the operation of adjusting the target flexible Ethernet group synchronously with the second network device based on the configuration information of the target flexible Ethernet group.

In an example embodiment, the determining module is further configured to: when a target physical layer link in the target flexible Ethernet group is to be deleted, if the backup flexible Ethernet map does not include information about the target physical layer link, determine that a target flexible Ethernet group obtained after the target physical layer link is deleted can support current traffic.

The adjustment module is configured to: in response to determining that the target flexible Ethernet group obtained after the target physical layer link is deleted can support the current traffic, perform the operation of adjusting the target flexible Ethernet group synchronously with the second network device based on the configuration information of the target flexible Ethernet group.

In an example embodiment, the determining module is further configured to: when physical layer links in the target flexible Ethernet group are to be regrouped, if the backup flexible Ethernet group number includes a group number of a regrouped flexible Ethernet group and the backup flexible Ethernet map includes information about a regrouped physical layer link, determine that the regrouped flexible Ethernet group can support a corresponding service flow.

The adjustment module is configured to: in response to a fact that the regrouped flexible Ethernet group can support the corresponding service flow, perform the operation of adjusting the target flexible Ethernet group synchronously with the second network device based on the configuration information of the target flexible Ethernet group.

In an example embodiment, the adjustment module is configured to: negotiate an adjustment time with the second network device, and when the adjustment time arrives, adjust the target flexible Ethernet group synchronously with the second network device based on the configuration information of the target flexible Ethernet group.

According to a fourth aspect, a flexible Ethernet group management apparatus is provided. The apparatus is used in a second network device, and the apparatus includes: a determining module configured to determine configuration information of a target flexible Ethernet group to be adjusted, where the configuration information of the target flexible Ethernet group includes a backup flexible Ethernet group number and a backup flexible Ethernet map of the target flexible Ethernet group, and the backup flexible Ethernet map includes information about a physical layer link in the target flexible Ethernet group; and an adjustment module configured to adjust the target flexible Ethernet group synchronously with a first network device based on the configuration information of the target flexible Ethernet group, where the first network device communicates with the second network device through the physical layer link in the target flexible Ethernet group.

In an example embodiment, the determining module is configured to negotiate, with the first network device through an overhead block, the configuration information of the target flexible Ethernet group to be adjusted. The overhead block carries the configuration information of the target flexible Ethernet group.

In an example embodiment, a reserved bit field of the overhead block carries the configuration information of the target flexible Ethernet group, or a management channel field of the overhead block carries the configuration information of the target flexible Ethernet group.

In an example embodiment, the determining module is configured to receive the configuration information that is sent by a controller to the second network device and the first network device and that is of the target flexible Ethernet group to be adjusted.

In an example embodiment, the adjustment module is configured to: negotiate an adjustment time with the first network device, and when the adjustment time arrives, adjust the target flexible Ethernet group synchronously with the first network device based on the configuration information of the target flexible Ethernet group.

That the new physical layer link is valid means that the following conditions are met: the new physical layer link is an independent physical layer link, the new physical layer link does not conflict with an existing physical layer link in the target flexible Ethernet group, and the new physical layer link can be aligned with a phase of an existing physical layer link in the target flexible Ethernet group.

A network device is further provided, and the device includes a memory and a processor. The memory stores a computer program or at least one instruction, and the computer program or the at least one instruction is loaded and executed by the processor, to implement the method according to the first aspect.

A network device is further provided, and the device includes a memory and a processor. The memory stores a computer program or at least one instruction, and the computer program or the at least one instruction is loaded and executed by the processor, to implement the method according to the second aspect.

A flexible Ethernet group management system is further provided, and the system includes a first network device and a second network device. The first network device is configured to perform the method according to the first aspect, and the second network device is configured to perform the method according to the second aspect.

A computer-readable storage medium is further provided, and the storage medium stores a computer program or at least one instruction. The computer program or the at least one instruction is loaded and executed by a processor, to implement any one of the foregoing methods.

A communications apparatus is provided. The apparatus includes a transceiver, a memory, and a processor. The transceiver, the memory, and the processor communicate with each other through an internal connection channel. The memory is configured to store instructions. The processor is configured to execute the instructions stored in the memory, to control the transceiver to receive and send signals. In addition, when the processor executes the instructions stored in the memory, the processor is enabled to perform the method in any one of the foregoing possible implementations.

In an example embodiment, there are one or more processors, and there are one or more memories.

In an example embodiment, the memory may be integrated with the processor, or the memory and the processor are separately disposed.

In some embodiments, the memory may be a non-transitory memory, for example, a read-only memory (ROM). The memory and the processor may be integrated on a same chip, or may be separately disposed on different chips. A type of the memory and a manner of disposing the memory and the processor are not limited in embodiments of the present disclosure.

A computer program product is provided. The computer program product includes computer program code. When the computer program code is run on a computer, the computer is enabled to perform the methods according to the foregoing aspects.

A chip is provided. The chip includes a processor configured to invoke instructions from a memory and run the instructions stored in the memory, to enable a communications device on which the chip is installed to perform the methods according to the foregoing aspects.

Another chip is provided, including an input interface, an output interface, a processor, and a memory. The input interface, the output interface, the processor, and the memory are connected to each other through an internal connection channel. The processor is configured to execute code in the memory. When the code is executed, the processor is configured to perform the methods according to the foregoing aspects.

DESCRIPTION OF EMBODIMENTS

Terms used in embodiments of the present disclosure are only used to explain specific embodiments, but are not intended to limit the present disclosure.

With diversification of Internet protocol (IP) network applications and services, there is a growing trend of increasing network traffic. Ethernet interface standard formulation and product development are step-by-step, and current Ethernet interface standards specify fixed rates. Therefore, there is a gap between a transmission requirement and an actual interface capability of a device, and a requirement for a higher bandwidth usually is met at a current Ethernet interface rate level. In view of this, an adaptation layer between a MAC layer and a PCS is created by using an Optical Internetworking Forum (OIF) FlexE technology, so that an Ethernet interface rate can flexibly match a plurality of service scenarios, and a device performance can be maximized without waiting for release of a new fixed-rate Ethernet standard when a network processor (NP)/forwarding device with a higher bandwidth emerges.

Figure 1:
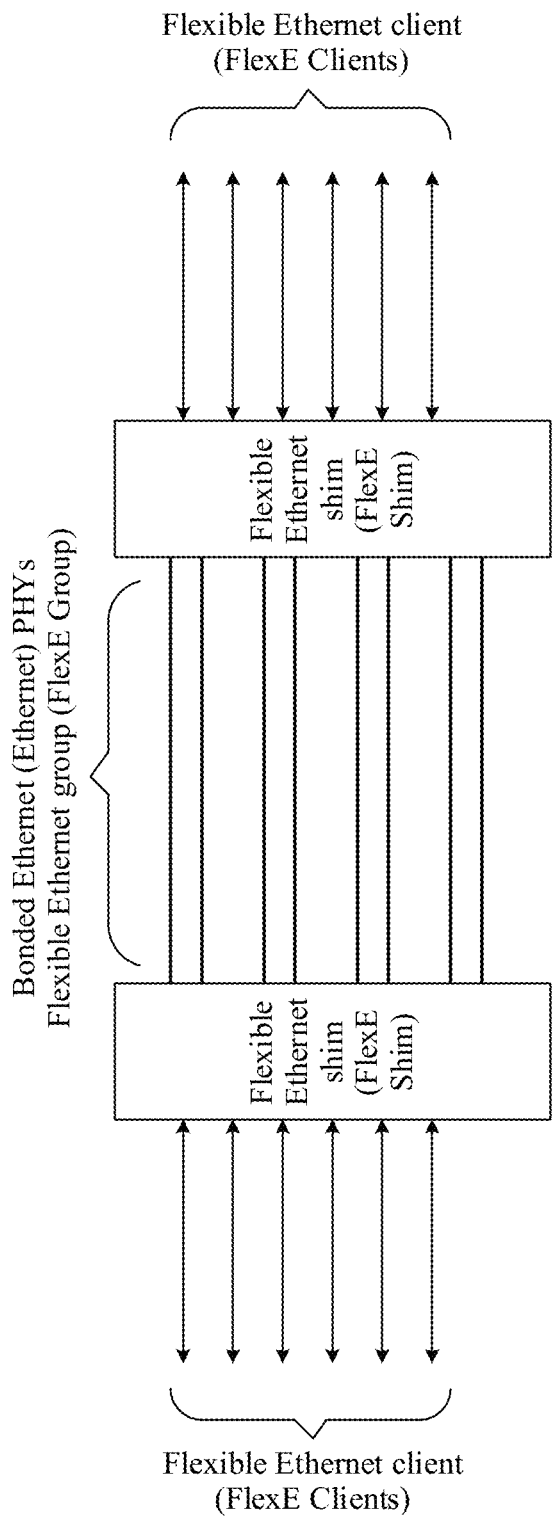
FIG. 1 is a schematic diagram of a structure of a FlexE group according to an embodiment of the present disclosure.

A basic function of FlexE is to map, based on a TDM mechanism of a FlexE shim, service flows of M FlexE clients to a FlexE group including N physical layer PHY links. Both M and N are positive integers. A basic structure of FlexE may be shown in FIG. 1. M is 6 and N is 4. To be specific, in FlexE shown in FIG. 1, service flows of six FlexE clients are mapped, based on a TDM mechanism of a FlexE shim, to a FlexE group including four PHY links.

Figure 2:
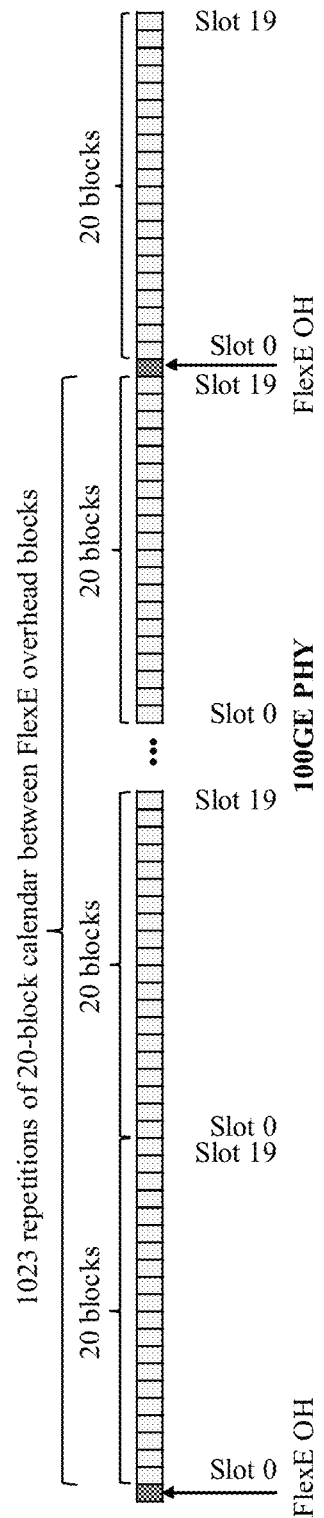
FIG. 2 is a schematic diagram of a data structure of a PHY link according to an embodiment of the present disclosure.

A 100GE (gigabit Ethernet) PHY is used as an example. In a FlexE mapping mechanism, each 100G PHY corresponds to a time slot corresponding to 20 64B/66B code blocks, and each code block corresponds to a payload rate of 5 Gbps. Current FlexE standards support FlexE on 100GE, 200GE, 400GE, and 50GE interfaces. A format of data passing through one 100GE PHY is shown in FIG. 2. In FIG. 2, each block is a 64B/66B block encoded according to Institute of Electrical and Electronics Engineers (IEEE) 802.3 Clause 82, every 20 blocks form one calendar, and each block is one time slot in the TDM mapping mechanism. One 64B/66B encoded overhead block is inserted after 1023 repetitions of each calendar. Then, every eight overhead blocks form one overhead frame, and every 32 overhead frames form one overhead multiframe. Client-slot mapping and various types of management of entire FlexE are implemented in overhead multiframes. Formats of an overhead frame and an overhead multiframe are shown in FIG. 3 or FIG. 4.

Figure 3:
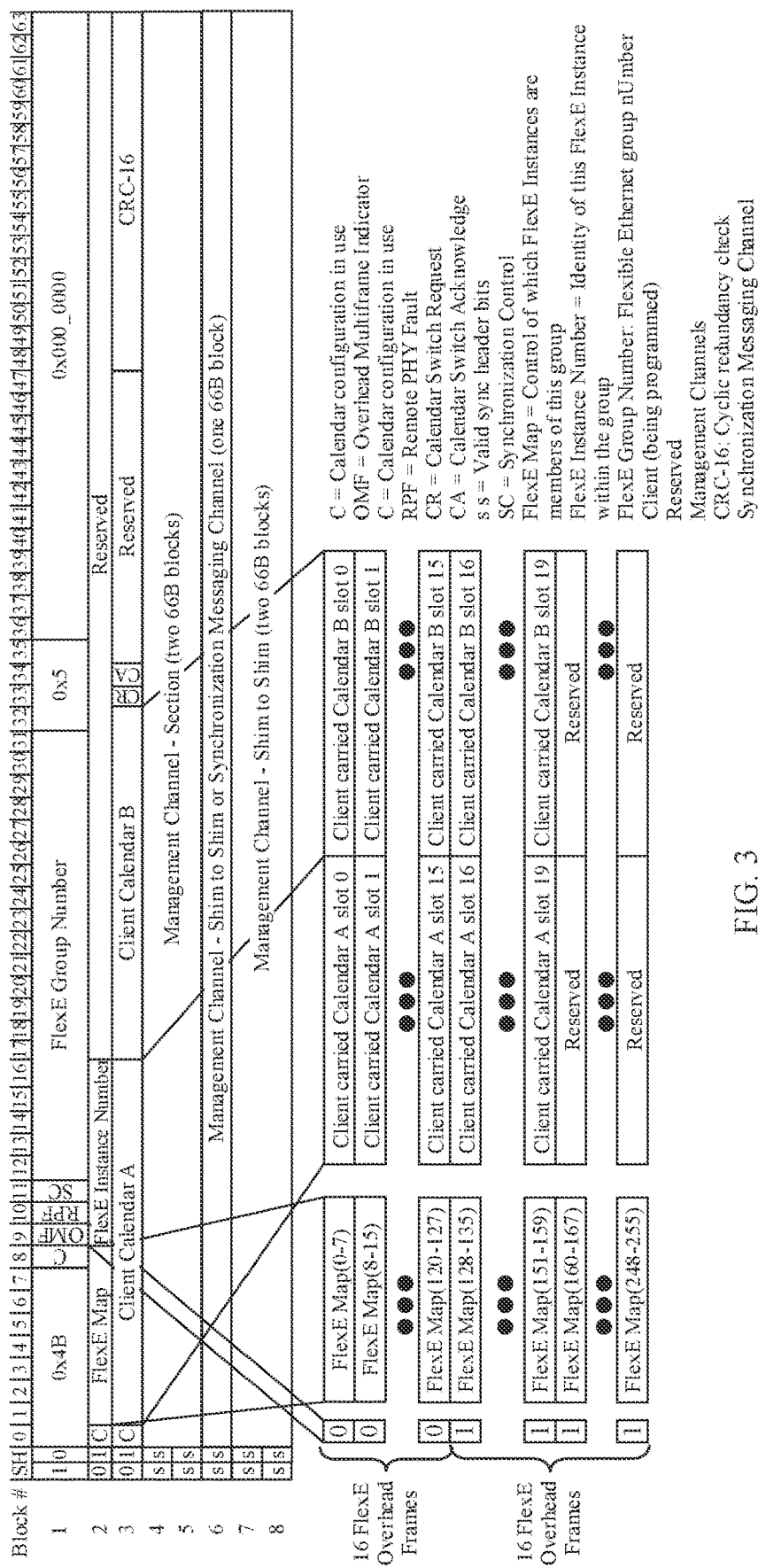
FIG. 3 is a schematic diagram of structures of an overhead frame and an overhead multiframe according to an embodiment of the present disclosure.
Figure 4:
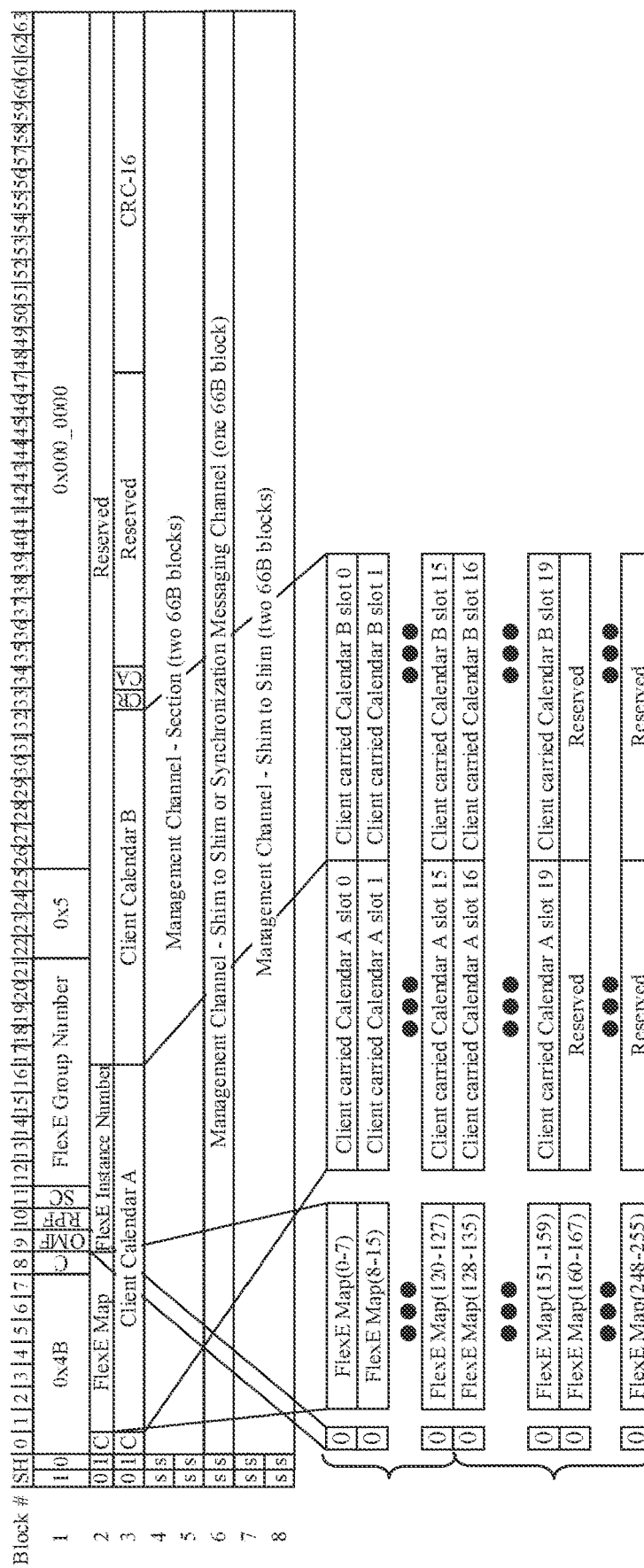
FIG. 4 is a schematic diagram of structures of an overhead frame and an overhead multiframe according to an embodiment of the present disclosure.

As shown in FIG. 3 or FIG. 4, a FlexE overhead (OH) frame includes calendar configuration information of all FlexE clients in a FlexE group. For the purpose of preventing a traffic loss when a FlexE client changes a slot bandwidth configuration, two calendars may be used: a calendar A and a calendar B. The two calendars have the following features:

Feature 1: At any time, only one calendar is in a working state. To be specific, at any time, either the calendar A is in a working state, or the calendar B is in a working state.

Feature 2: A calendar negotiation mechanism of a FlexE OH is used for a connection between a transmit end (TX) and a receive end (RX) of a FlexE group, to ensure that working calendars of the TX and the RX are consistent.

For example, if the calendar A is in a working state, the calendar B is in a backup state of a corresponding calendar configuration.

Feature 3: The TX initiates calendar negotiation, and the RX is in a passive receiving state. If the calendar A is in a working state, the TX updates a changed calendar B to the RX through the FlexE OH overhead. Subsequently, the TX initiates a calendar switch request (CSR) calendar negotiation request for switching a working calendar to the calendar B. After the TX receives a response from the RX, the TX triggers both the TX and the RX to switch working calendars to the calendar B.

It should be noted that, after a connection is established for the first time between the TX and the RX of the FlexE group, calendar negotiation of a FlexE OH overhead is also triggered once, to ensure that working calendars of the two ends are consistent.

In addition to the foregoing calendar A and calendar B, FIG. 3 or FIG. 4 further includes the following information:

C: C indicates a calendar configuration in use. In the overhead frame shown in FIG. 3 or FIG. 4, a bit field numbered 8 in the first block, a bit field numbered 0 in the second block, and a bit field numbered 0 in the third block each carry C.

Overhead multiframe indicator (OMFI), referred to as an OMF in standards such as IA OIF-FLEXE-01.0/01.1/02.2/02.1: An overhead multiframe indicator indicates a boundary of a multiframe. In the overhead frame shown in FIG. 3 or FIG. 4, a bit field numbered 9 in the first block carries the OMF. In one multiframe, values of OMFs of first 16 single frames are 0, and values of OMFs of last 16 single frames are 1. A boundary of the multiframe can be determined through conversion between 0 and 1.

Remote physical fault (RPF): A remote physical fault indicates a remote physical fault. In the overhead frame shown in FIG. 3 or FIG. 4, a bit field numbered 10 in the first block carries the RPF.

Synchronization control (SC): Synchronization control is used for synchronization control. In the overhead frame shown in FIG. 3 or FIG. 4, a bit field numbered 11 in the first block carries the SC.

Flexible Ethernet map (FlexE Map): A flexible Ethernet map is used for control of which FlexE instances are members of this group (Control of which FlexE Instances are members of this group). In the overhead frame shown in FIG. 3 or FIG. 4, bit fields numbered 1 to 8 in the second block carry the FlexE map. For example, the FlexE map includes information about a physical layer link in a FlexE group, each bit of the FlexE map corresponds to one physical layer link, and a value of each bit of the FlexE map indicates whether the physical layer link corresponding to the bit is in the FlexE group. For example, if a value of a bit is a first value, for example, the first value is 1, it is considered that a physical layer link corresponding to the bit is in the FlexE group. If a value of a bit is a second value, for example, the second value is 0, it is considered that a physical layer link corresponding to the bit is not in the FlexE group.

Flexible Ethernet instance number (FlexE instance Number): A flexible Ethernet instance number indicates an identity of this FlexE instance within the group. In the overhead frame shown in FIG. 3 or FIG. 4, bit fields numbered 9 to 16 in the second block carry the FlexE instance number.

Flexible Ethernet group number (FlexE Group Number): A flexible Ethernet group number is used to identify a flexible Ethernet group. In the overhead frame shown in FIG. 3 or FIG. 4, bit fields numbered 12 to 21 in the first block carry the FlexE group number.

Calendar switch acknowledgment (CSA): A calendar switch acknowledgment is referred to as a CA in standards such as implementation agreement (IA) OIF-FLEXE-01.0/01.1/02.2/02.1, where 01.0, 01.1, 02.2, and 02.1 are several versions of the IA OIF-FLEXE standard. In the overhead frame shown in FIG. 3 or FIG. 4, a bit field numbered 34 in the third block carries the CA.

Calendar switch request (CSR): A calendar switch request is referred to as a CR in standards such as IA OIF-FLEXE-01.0/01.1/02.2/02.1. In the overhead frame shown in FIG. 3 or FIG. 4, a bit field numbered 33 in the third block carries the CR.

Synchronization header (SH): A synchronization header is a frame header of the overhead frame shown in FIG. 3 or FIG. 4.

S: S indicates a valid sync header bit. In the overhead frame shown in FIG. 3 or FIG. 4, fields in SH in the fourth block to the eighth block each carry the S.

Management channel: In the overhead frame shown in FIG. 3 or FIG. 4, the fourth block to the eighth block carry the management channel.

CRC-16: CRC-16 is used to perform cyclic redundancy check (CRC) protection on content of an overhead block. In the overhead frame shown in FIG. 3 or FIG. 4, bit fields numbered 48 to 63 in the third block carry the CRC-16.

In addition to the fields including the foregoing information, FIG. 3 or FIG. 4 further includes a reserved field. In the overhead frame shown in FIG. 3 or FIG. 4, bit fields numbered 17 to 63 in the second block and bit fields numbered 35 to 47 in the third block each are a reserved field.

In some embodiments, a user may change a quantity of PHYs in a FlexE group for a current network based on traffic volumes and a quantity of FlexE clients. For example, when a bandwidth provided by a PHY in a FlexE group is insufficient, one or more PHYs are added to the current FlexE group to support more service flows. Alternatively, when a large amount of bandwidth is idle in the current FlexE group, one or more PHYs may be removed to release network resources for other services. Alternatively, in the current FlexE group, there is a requirement that the current FlexE group be divided into two or more FlexE groups, to adapt to a current service model.

All of the foregoing operations relate to adjustment at a FlexE group level. For adjustment to a FlexE group, currently, the current FlexE group is removed, and one or more new FlexE groups are established according to a requirement. Each FlexE group includes a PHY required by the FlexE group. In other words, in this FlexE group adjustment manner, for dynamic adjustment to the FlexE group, regardless of whether a PHY is added or deleted or the current FlexE group is divided into a plurality of sub-FlexE groups, the current FlexE group is first removed, and then a new FlexE group is established. Therefore, a current service flow of a FlexE client cannot continue to be transmitted in the adjustment process, and a service interruption occurs in normal transmission.

In view of this, an embodiment of the present disclosure provides a flexible Ethernet group management method. The method provides a management method for losslessly and dynamically adjusting a FlexE group, to implement adjustment in the foregoing scenarios without affecting a service.

Figure 5:
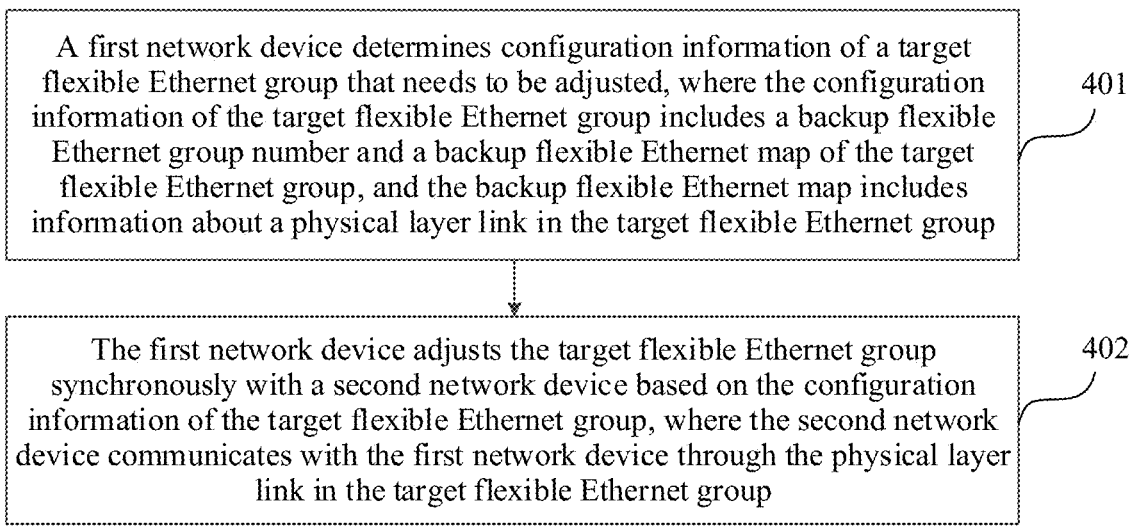
FIG. 5 is a flowchart of a flexible Ethernet group management method according to an embodiment of the present disclosure.

As shown in FIG. 5, the method provided in this embodiment of the present disclosure includes the following processes.

401: A first network device determines configuration information of a target flexible Ethernet group to be adjusted. The configuration information of the target flexible Ethernet group includes a backup flexible Ethernet group number and a backup flexible Ethernet map of the target flexible Ethernet group, and the backup flexible Ethernet map includes information about a physical layer link in the target flexible Ethernet group.

In an example embodiment, that a first network device determines configuration information of a target flexible Ethernet group to be adjusted includes but is not limited to the following two manners.

Manner 1: That a first network device determines configuration information of a target flexible Ethernet group to be adjusted includes: The first network device negotiates, with a second network device through an overhead block, the configuration information of the target flexible Ethernet group to be adjusted. The overhead block carries the configuration information of the target flexible Ethernet group.

Figure 6:
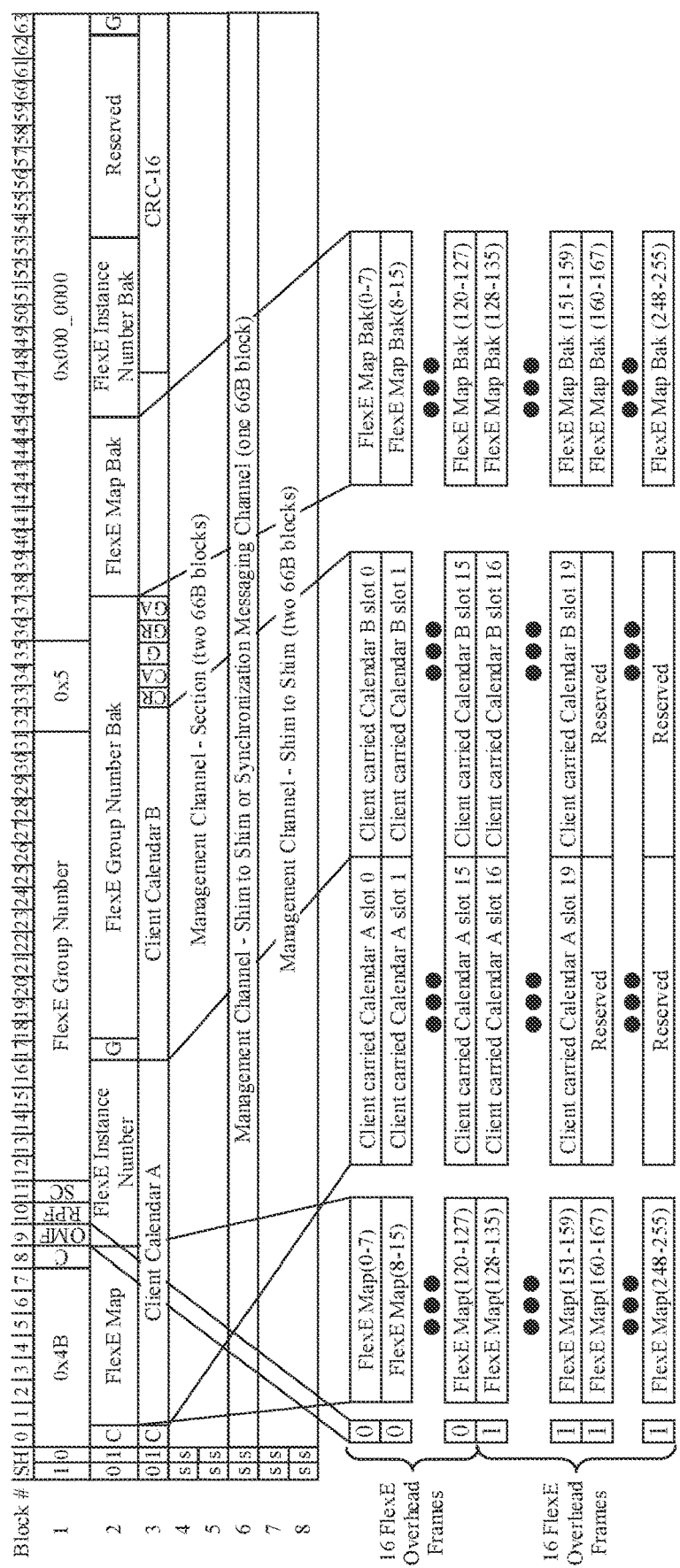
FIG. 6 is a schematic diagram of structures of an overhead frame and an overhead multiframe according to an embodiment of the present disclosure.
Figure 7:
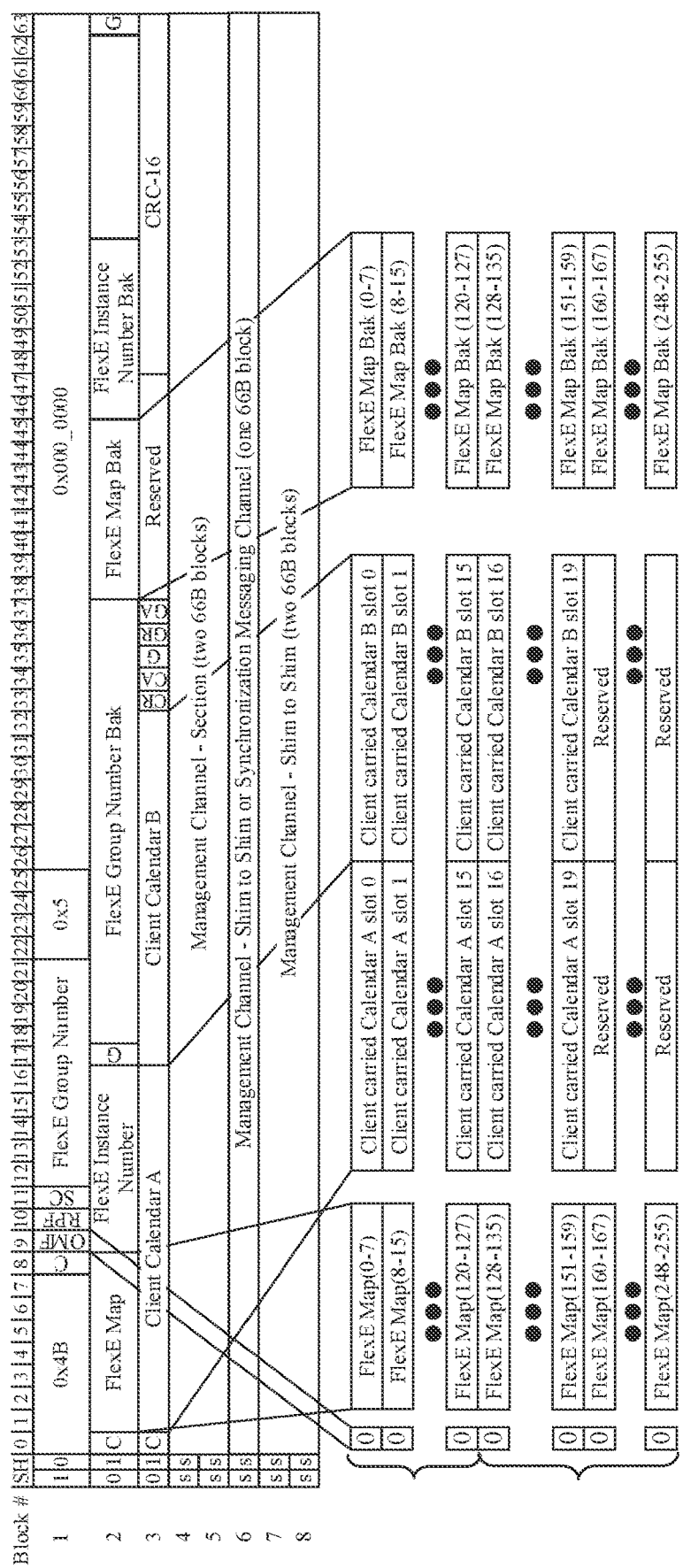
FIG. 7 is a schematic diagram of structures of an overhead frame and an overhead multiframe according to an embodiment of the present disclosure.

In manner 1, a reserved bit field of the overhead block carries the configuration information of the target flexible Ethernet group. As shown in FIG. 6 or FIG. 7, in reserved bit fields, 20 bits are selected as a backup flexible Ethernet group number (FlexE Group Number Bak), 8 bits are selected as a backup flexible Ethernet map (FlexE Map Bak), and 8 bits are selected as a backup flexible Ethernet instance number (FlexE Instance Number Bak). The bits form a master-backup relationship with original corresponding bit fields. Bak in FlexE group number Bak, FlexE map Bak, and FlexE instance number Bak is short for backup and represents backup. For example, a master-backup relationship is formed between a FlexE group number Bak carried in bit fields numbered 18 to 37 in the second block in an overhead frame shown in FIG. 6 or FIG. 7 and a FlexE group number carried in bit fields numbered 12 to 21 in the first block in the overhead frame shown in FIG. 6 or FIG. 7. A master-backup relationship is formed between a FlexE map Bak carried in bit fields numbered 38 to 45 in the second block in the overhead frame shown in FIG. 6 or FIG. 7 and a FlexE map carried in bit fields numbered 1 to 8 in the second block in the overhead frame shown in FIG. 6 or FIG. 7. A master-backup relationship is formed between a FlexE instance number Bak carried in bit fields numbered 46 to 53 in the second block in the overhead frame shown in FIG. 6 or FIG. 7 and a FlexE instance number carried in bit fields numbered 9 to 16 in the second block in the overhead frame shown in FIG. 6 or FIG. 7.

Two bits are selected from the reserved bit fields as GR and GA for a request/acknowledge mechanism. For example, a bit field numbered 36 in the third block in the overhead frame shown in FIG. 6 or FIG. 7 carries GR and a bit field numbered 37 in the third block in the overhead frame shown in FIG. 6 or FIG. 7 carries GA.

In the reserved bit fields, three bits (for example, block #2 bit 17 & 63 and block #3 bit 35) are selected as GGG bits to indicate switching.

Figure 8:
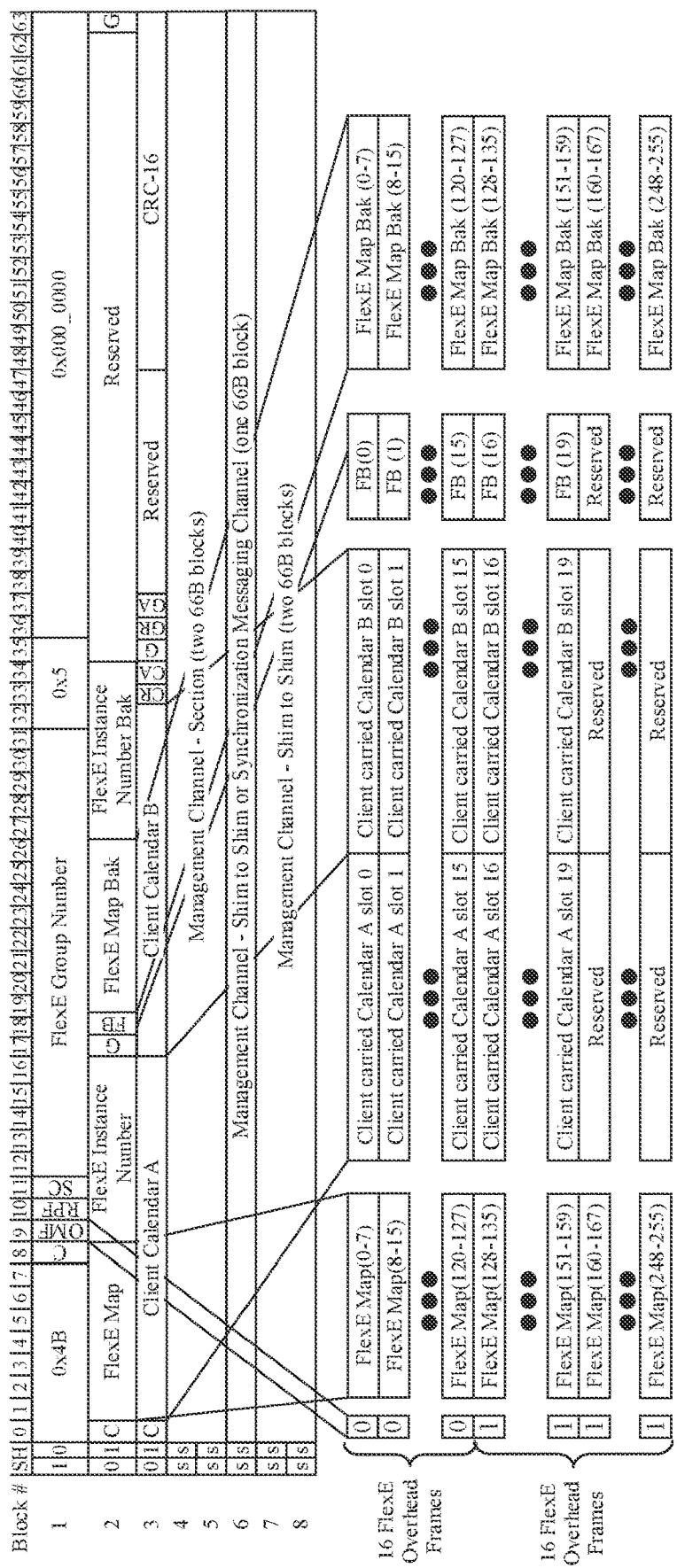
FIG. 8 is a schematic diagram of structures of an overhead frame and an overhead multiframe according to an embodiment of the present disclosure.
Figure 9:
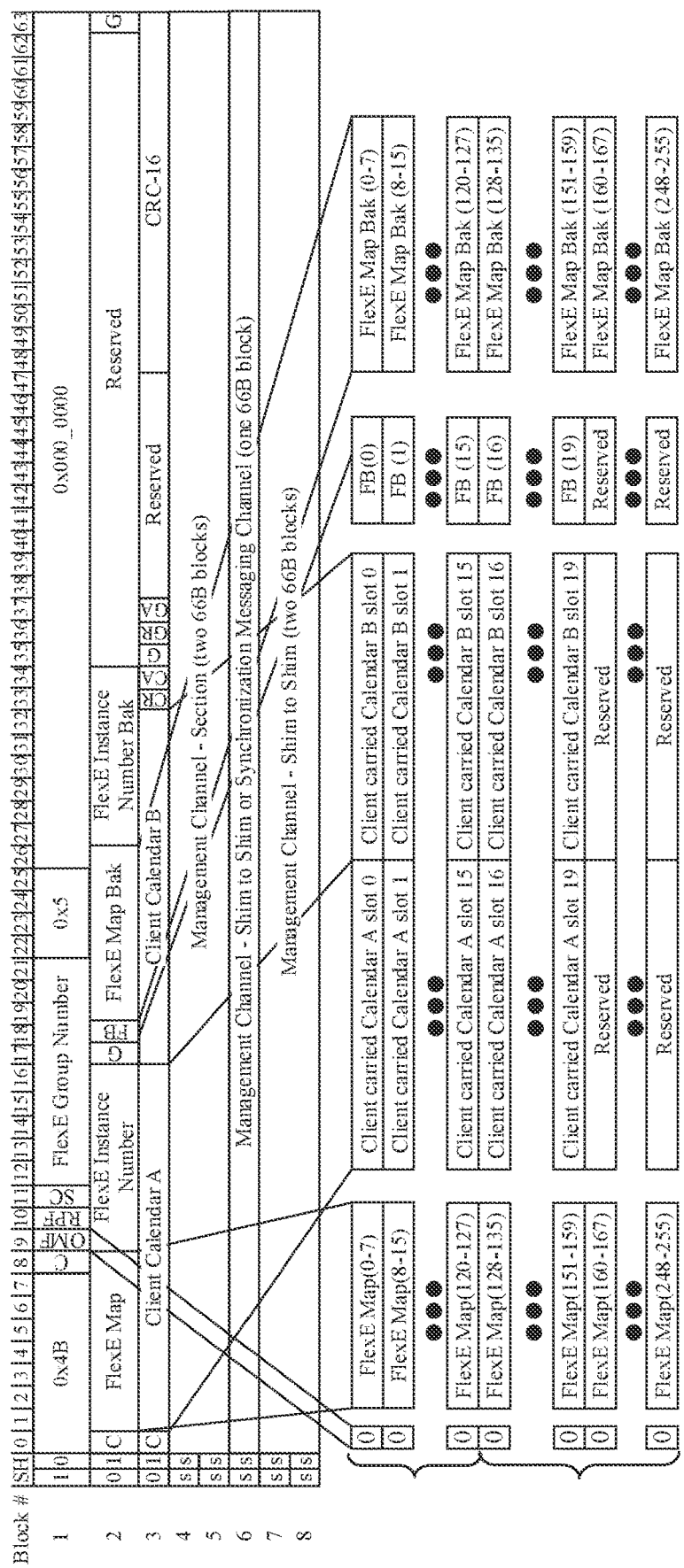
FIG. 9 is a schematic diagram of structures of an overhead frame and an overhead multiframe according to an embodiment of the present disclosure.

In an example embodiment, in addition to using the reserved bit fields to carry the foregoing information, embodiments of the present disclosure further provide another manner of carrying the foregoing information. For example, the manner may be shown in FIG. 8 or FIG. 9. Only 1-bit FlexE group number Bak is transmitted in each overhead frame. As shown by the FB in FIG. 8 or FIG. 9, the FB represents a 1-bit FlexE group number Bak, and all bit fields of the FlexE group number Bak are transmitted through a multiframe. For example, only 1-bit FlexE instance number Bak may alternatively be transmitted in each overhead frame, and may occupy only one bit in the overhead frame, and all bit fields of the FlexE instance number Bak are transmitted through a multiframe. In addition, in the method provided in this embodiment, using only 1-bit G instead of 3-bit GGG is further supported. This manner is applicable to only a case in which a system bit error rate $\ll$1e-12, that is, is applicable to a case in which the system bit error rate is far less than $10^{-12}$.

It should be noted that, the foregoing is a manner in which reserved bit fields in overheads are saved, and a quantity of bits transmitted through each frame is not limited in this embodiment (for example, four bits or five bits of the FlexE group number Bak may be transmitted through each frame).

In addition to the foregoing manner, the configuration information of the target flexible Ethernet group may alternatively be carried by a management channel field of an overhead block. For example, as shown in FIG. 3 or FIG. 4, the management channel may be indicated by the fourth block to the eighth block in the FlexE overhead frame. According to the method provided in this embodiment, the first network device and the second network device can negotiate with each other through the management channel, to determine the configuration information of the target flexible Ethernet group. The management channel may carry a plurality of protocols. Therefore, in an example in which the management channel carries an Ethernet packet, the configuration information of the target flexible Ethernet group may be negotiated through the Ethernet packet. It should be noted that because the management channel occupies space of four blocks in the FlexE overhead frame, specific fields of the management channel that are used to negotiate the configuration information of the target flexible Ethernet group are not limited in this embodiment. In some embodiments, a protocol that may be carried by the management channel is the link layer discovery protocol (LLDP) or the precision time protocol (PTP).

Manner 2: That a first network device determines configuration information of a target flexible Ethernet group to be adjusted includes: The first network device receives the configuration information that is sent by a controller to the first network device and a second network device and that is of the target flexible Ethernet group to be adjusted.

In this manner, through upper-layer management, for example, a software defined network (SDN) controller separately communicates with management interfaces of the first network device and the second network device, to deliver the configuration information of the target flexible Ethernet group to be adjusted.

Regardless of which manner is used to determine the configuration information of the target flexible Ethernet group to be adjusted, after the first network device determines the configuration information of the target flexible Ethernet group to be adjusted, for different adjustment cases, before the target flexible Ethernet group is adjusted, one or more of the following three processing manners are included but not limited.

Processing manner 1: When a new physical layer link is added to the target flexible Ethernet group, if the backup flexible Ethernet map includes information about the new physical layer link, the first network device determines whether the new physical layer link is valid.

In response to determining that the new physical layer link is valid, the first network device performs an operation of adjusting the target flexible Ethernet group synchronously with the second network device based on the configuration information of the target flexible Ethernet group.

The new physical layer link is a physical layer link that is not previously included in the target flexible Ethernet group. Before the new physical layer link is added to the target flexible Ethernet group, whether the new physical layer link is valid is first determined, to avoid a conflict. A manner of determining whether the new physical layer link is valid is not limited in this embodiment. If the new physical layer link is valid, the following conditions need to be met, but this is not limited.

Condition 1: The new physical layer link is an independent physical layer link, and is not in another flexible Ethernet group.

Condition 2: The new physical layer link does not conflict with an existing physical layer link in the target flexible Ethernet group.

Condition 3: The new physical layer link can be aligned with a phase of an existing physical layer link in the target flexible Ethernet group.

Before the new physical layer link is added to the target flexible Ethernet group, whether the new physical layer link meets the foregoing three conditions may be first determined. A determining sequence for the three conditions is not limited in this embodiment In an example embodiment, for the condition 1, determining whether the new physical layer link is an independent physical layer link includes but is not limited to determining whether a group number of the new physical layer link is valid. If the group number of the new physical layer link is valid, it means that the new physical layer link is in another group and is not an independent physical layer link. If the group number of the new physical layer link is invalid, for example, the group number is all 0s or all fs, it means that the new physical layer link is not in another group and is an independent physical layer link. In this case, if the new physical layer link is to be added to the target flexible Ethernet group, the new physical layer link is first removed from a previous flexible Ethernet group in which the new physical layer link is located, and then the new physical layer link is added to the target flexible Ethernet group only when the new physical layer link meets the other conditions.

In an example embodiment, for the condition 2, determining whether the new physical layer link conflicts with an existing physical layer link in the target flexible Ethernet group includes but is not limited to determining whether a FlexE instance number of the new physical layer link is consistent with a FlexE instance number of the existing physical layer link in the target flexible Ethernet group. If a FlexE instance number of any one of existing physical layer links in the target flexible Ethernet group is consistent with the FlexE instance number of the new physical layer link, it is considered that a conflict exists. If a FlexE instance number of any one of existing physical layer links in the target flexible Ethernet group is not consistent with the FlexE instance number of the new physical layer link, it is considered that no conflict exists. In a case in which a conflict exists, a FlexE instance number of at least one physical layer link in the physical layer link conflicting with the new physical layer link and the new physical layer link is changed, so that no conflict exists. Then, the new physical layer link is added to the target flexible Ethernet group only when the new physical layer link meets the other conditions.

In an example embodiment, for the condition 3, determining whether the new physical layer link can be aligned with a phase of an existing physical layer link in the target flexible Ethernet group includes but is not limited to determining whether an interval between a frame header of an overhead multiframe of the new physical layer link and a frame header of an overhead multiframe of each existing physical layer link in the target flexible Ethernet group is within a reference range. If the interval between the frame header of the overhead multiframe of the new physical layer link and the frame header of the overhead multiframe of each existing physical layer link in the target flexible Ethernet group is within the reference range, the new physical layer link can be aligned with a phase of the existing physical layer link in the target flexible Ethernet group. If the interval between the frame header of the overhead multiframe of the new physical layer link and the frame header of the overhead multiframe of each existing physical layer link in the target flexible Ethernet group is not within the reference range, the new physical layer link cannot be aligned with a phase of the existing physical layer link in the target flexible Ethernet group. For example, the reference range is +/−13 μs. If the interval between the frame header of the overhead multiframe of the new physical layer link and the frame header of the overhead multiframe of each existing physical layer link in the target flexible Ethernet group is within the reference range of +/−13 μs, the new physical layer link can be aligned with a phase of the existing physical layer link in the target flexible Ethernet group. If an interval between the frame header of the overhead multiframe of the new physical layer link and a frame header of an overhead multiframe of any existing physical layer link in the target flexible Ethernet group is not within the reference range of +/−13 μs, the new physical layer link cannot be aligned with a phase of the existing physical layer link in the target flexible Ethernet group.

When the new physical layer link meets the foregoing conditions, the new physical layer link may be added to the target flexible Ethernet group. If the new physical layer link does not meet any one of the foregoing conditions, an alarm may be initiated to notify a user that the adjustment to the target flexible Ethernet group cannot be completed.

Processing manner 2: When a target physical layer link in the target flexible Ethernet group is to be deleted, if the backup flexible Ethernet map does not include information about the target physical layer link, the first network device determines whether a target flexible Ethernet group obtained after the target physical layer link is deleted can support current traffic.

In response to a fact that the target flexible Ethernet group obtained after the target physical layer link is deleted can support the current traffic, the first network device performs an operation of adjusting the target flexible Ethernet group synchronously with the second network device based on the configuration information of the target flexible Ethernet group. That "the target flexible Ethernet group obtained after the target physical layer link is deleted can support the current traffic" means that a total bandwidth of a remaining physical layer link in the target flexible Ethernet group obtained after the target physical layer link is deleted is not less than a bandwidth required by a service flow that should be currently carried by the target flexible Ethernet group obtained after the target physical layer link is deleted.

According to the method provided in this embodiment, for the processing manner 2, for the purpose of deleting the target physical layer link in the target flexible Ethernet group without affecting a service flow, before the target physical layer link in the target flexible Ethernet group is deleted, whether the target flexible Ethernet group obtained after the target physical layer link is deleted can support the current traffic is first determined.

For example, that the first network device determines whether the target flexible Ethernet group obtained after the target physical layer link is deleted can support the current traffic includes but is not limited to determining whether a total bandwidth of a remaining physical layer link in the target flexible Ethernet group obtained after the target physical layer link is deleted is less than a bandwidth required by a service flow that should be currently carried by the target flexible Ethernet group obtained after the target physical layer link is deleted. If the total bandwidth of the remaining physical layer link in the target flexible Ethernet group obtained after the target physical layer link is deleted is not less than the bandwidth required by the service flow that should be currently carried by the target flexible Ethernet group obtained after the target physical layer link is deleted, it may be determined that the target flexible Ethernet group obtained after the target physical layer link is deleted can support the current traffic.

In an example embodiment, if the total bandwidth of the remaining physical layer link in the target flexible Ethernet group obtained after the target physical layer link is deleted is less than the bandwidth required by the service flow that should be currently carried by the target flexible Ethernet group obtained after the target physical layer link is deleted, it is determined that the target flexible Ethernet group obtained after the target physical layer link is deleted cannot support the current traffic. In this case, an alarm may be initiated to notify a user that the adjustment operation may affect the service flow.

For example, the target flexible Ethernet group includes five physical layer links. When one of the five physical layer links is to be deleted, if a total bandwidth of remaining four physical layer links is 100G, and a bandwidth required by a service flow that should be currently carried by the target flexible Ethernet group obtained after the target physical layer link is deleted is 90G, it may be determined that the target flexible Ethernet group obtained after the target physical layer link is deleted can support current traffic.

Processing manner 3: When physical layer links in the target flexible Ethernet group are to be regrouped, if the backup flexible Ethernet group number includes a group number of a regrouped flexible Ethernet group and the backup flexible Ethernet map includes information about a regrouped physical layer link, the first network device determines whether the regrouped flexible Ethernet group can support a corresponding service flow.

In response to a fact that the regrouped flexible Ethernet group can support the corresponding service flow, the first network device performs an operation of adjusting the target flexible Ethernet group synchronously with the second network device based on the configuration information of the target flexible Ethernet group.

Because the target flexible Ethernet group carries a service flow, if the target flexible Ethernet group is divided, it needs to be ensured that a flexible Ethernet group obtained after division can still carry a corresponding service flow, so that the flexible Ethernet group is divided without affecting the service flow. Therefore, according to the method provided in this embodiment, when the physical layer links in the target flexible Ethernet group are regrouped, whether the regrouped flexible Ethernet group can support the corresponding service flow is first determined.

For example, determining whether the regrouped flexible Ethernet group can support the corresponding service flow includes but is not limited to determining whether a total bandwidth of physical layer links in the regrouped flexible Ethernet group is less than a bandwidth required to carry the corresponding service flow. If the total bandwidth of the physical layer link in the regrouped flexible Ethernet group is not less than the bandwidth required to carry the corresponding service flow, it may be determined that the regrouped flexible Ethernet group can support the corresponding service flow.

For example, a total bandwidth of physical layer links in the target flexible Ethernet group before the regrouping is 4×100G, that is, 400G in total. The physical layer links in the target flexible Ethernet group is regrouped, to obtain two regrouped flexible Ethernet groups, which are referred to as a first group and a second group for short. Both total bandwidths of physical layer links in the first group and the second group are 200G. If the target flexible Ethernet group carries three service flows: a first service flow of 200G, a second service flow of 150G, and a third service flow of 50G. For this regrouping, the first service flow is allocated to the first group, and the second service flow and the third service flow are allocated to the second group. In other words, a service flow corresponding to the first group is the first service flow of 200G, and a service flow corresponding to the second group is the second service flow of 150G plus the third service flow of 50G. Because a total bandwidth of a physical layer link in the first group is 200G, and is not less than a bandwidth required to carry the first service flow of 200G, the first group can support the corresponding first service flow of 200G. Because a total bandwidth of a physical layer link in the first group is 200G, and is not less than a bandwidth 150G+50G=200G that is required to carry the second service flow plus the third service flow, the second group can support the corresponding second service flow and third service flow. Therefore, the physical layer links in the target flexible Ethernet group can be regrouped.

In an example embodiment, if the total bandwidth of the physical layer link in the regrouped flexible Ethernet group is less than the bandwidth required to carry the corresponding service flow, it may be determined that the regrouped flexible Ethernet group cannot support the corresponding service flow. In this case, an alarm may be initiated to notify a user that the division operation may affect the service flow.

For example, a total bandwidth of physical layer links in the target flexible Ethernet group before the regrouping is 4×100G, that is, 400G in total. The physical layer links in the target flexible Ethernet group is regrouped, to obtain two regrouped flexible Ethernet groups, which are referred to as a first group and a second group for short. Both total bandwidths of physical layer links in the first group and the second group are 200G. If the target flexible Ethernet group carries three service flows: a first service flow of 250G, a second service flow of 125G, and a third service flow of 50G. For this regrouping, the first service flow is allocated to the first group, and the second service flow and the third service flow are allocated to the second group. In other words, a service flow corresponding to the first group is the first service flow of 250G, and a service flow corresponding to the second group is the second service flow of 125G plus the third service flow of 50G. Because a total bandwidth of a physical layer link in the second group is 200G, and is not less than a bandwidth 125G+50G=175G that is required to carry the second service flow plus the third service flow, the second group can support the corresponding second service flow and third service flow. However, because a total bandwidth of a physical layer link in the first group is 200G, and is less than a bandwidth required to carry the first service flow of 250G, the first group cannot support the corresponding first service flow of 250G. Therefore, the physical links in the target flexible Ethernet group is not regrouped.

Service flows corresponding to the regrouped flexible Ethernet groups may be randomly allocated, or a service flow corresponding to each regrouped flexible Ethernet group may be determined based on a volume of the service flow and a total bandwidth of a physical layer link in the regrouped flexible Ethernet groups. For example, a relatively large service flow is preferentially allocated to a regrouped flexible Ethernet group having a relatively large total bandwidth. Alternatively, another allocation manner may be used. A manner of determining a service flow corresponding to a regrouped flexible Ethernet group is not limited in this embodiment.

It should be noted that, in group numbers of the regrouped flexible Ethernet groups, one group number may be the same as the group number of the target flexible Ethernet group before the regrouping, and a group number of a remaining regrouped flexible Ethernet group is different from the group number of the target flexible Ethernet group before the regrouping. Alternatively, group numbers of all the regrouped flexible Ethernet groups may be different from the group number of the target flexible Ethernet group before the regrouping.

402: The first network device adjusts the target flexible Ethernet group synchronously with the second network device based on the configuration information of the target flexible Ethernet group. The second network device communicates with the first network device through the physical layer link in the target flexible Ethernet group.

When the flexible Ethernet group is to be adjusted, the first network device and the second network device perform adjustment synchronously, so that a service flow may not be affected. For example, the configuration information of the target flexible Ethernet group includes the backup flexible Ethernet group number and the backup flexible Ethernet map of the target flexible Ethernet group, and the backup flexible Ethernet map includes the information about the physical layer link in the target flexible Ethernet group. Therefore, when the first network device adjusts the target flexible Ethernet group synchronously with the second network device based on the configuration information of the target flexible Ethernet group, the group number of the target flexible Ethernet group may be switched to the backup flexible Ethernet group number, and a flexible Ethernet map of the target flexible Ethernet group may be switched to the backup flexible Ethernet map.

In an example embodiment, that the first network device adjusts the target flexible Ethernet group synchronously with the second network device based on the configuration information of the target flexible Ethernet group includes:

The first network device negotiates an adjustment time with the second network device. When the adjustment time arrives, the first network device adjusts the target flexible Ethernet group synchronously with the second network device based on the configuration information of the target flexible Ethernet group.

It should be noted that, when the second network device performs the flexible Ethernet group management method, refer to the foregoing management manner of the first network device.

In the following, the foregoing flexible Ethernet group management method is described by using different adjustment cases as examples.

Figure 10:
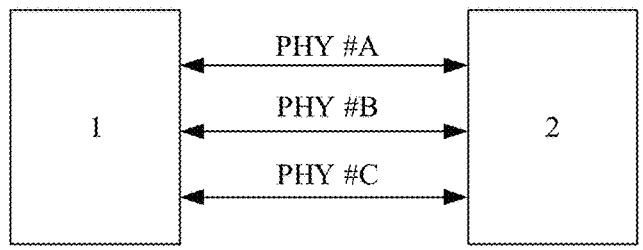
FIG. 10 is a schematic diagram of a structure of a flexible Ethernet group management system according to an embodiment of the present disclosure.

First, a system shown in FIG. 10 is used as an example. The first network device is referred to as a device 1, and the second network device is referred to as a device 2. The device 1 initiates a FlexE group change, to add a PHY #C to a FlexE group in which a PHY #A and a PHY #B are located. A value of a current FlexE group number corresponding to the group is X. The group is directly referred to as a FlexE group X below.

Based on the flexible Ethernet group management method provided in embodiments of the present disclosure, before the PHY #C is added to the FlexE group in which the PHY #A and the PHY #B are located, a step of checking the PHY #C is first completed, to determine whether the PHY #C can be added to the FlexE group X as a valid PHY. The check process includes but is not limited to: determining whether the PHY #C is an independent PHY or is in another FlexE group. If the PHY #C is in another FlexE group, the PHY #C is first removed from the another FlexE group. For details about a manner of removing the PHY #C from the another FlexE group, refer to the following embodiment shown in FIG. 13. Whether a FlexE instance number of the newly added PHY #C conflicts with a FlexE instance number of the PHY #A and a FlexE instance number of the PHY #B is further determined. If a conflict occurs, one of the FlexE instance numbers is modified. A specific physical layer link whose FlexE instance number is to be modified is not limited in embodiments of the present disclosure. For example, a FlexE instance number Bak corresponding to the newly added PHY #C may be modified. In addition, it is further ensured that the PHY #C can be aligned with phases of the PHY #A and the PHY #B. For example, the deskew requirement is that the maximum deskew is within +/−13 µs as required in FlexE. A deskew manner is not limited in embodiments of the present disclosure.

If the foregoing conditions cannot be met, an alarm is reported to notify a user that the current adjustment may fail to be implemented. After the checking is completed, for specific steps, refer to FIG. 11, including but not limited to the following steps.

Step 1: The device 1 initiates a FlexE group change, and sets GR in an overhead block to 1. In this case, GR=1, and a request mechanism is started. In other words, the device 1 initiates a request to the device 2. Because the PHY #C is to be added, the device 1 modifies a FlexE group number Bak of the PHY #C. For example, a FlexE group number Bak of the PHY #A/B/C is set to X, that is, the FlexE group number Bak of the PHY #C is modified to X. In addition, the device 1 updates a FlexE map Bak and adds the PHY #C. In other words, the FlexE map Bak includes not only information about the PHY #A/B, but also information about the PHY #C.

It should be noted that, if the FlexE instance number of the PHY #C does not conflict with the FlexE instance number of the PHY #A/B, the FlexE instance number Bak of the PHY #C is not updated. If the FlexE instance number of the PHY #C conflicts with the FlexE instance number of the PHY #A/B, the FlexE instance number Bak of the PHY #C is updated. For example, the FlexE instance number Bak of the PHY #C is modified to be different from the FlexE instance number of the PHY #A/B.

Step 2: If a skew between the PHY #A/B/C meets a requirement, the device 2 feeds back GA=1 through the PHY #C, to indicate that X may be used to perform transmission in a bit field of the FlexE group number Bak.

Optionally, if the skew between the PHY #A/B/C does not meet a requirement, the device 2 does not feed back GA=1, and waits for a timeout error to exit the procedure.

Step 3: For a case in which the device 2 feeds back GA=1, G=1, and the device 1 and the device 2 transfer, from a next multiframe header, FlexE clients service flows through the FlexE group X that includes the PHY #A/B/C.

Step 4: The device 2 copies a FlexE group number to obtain a FlexE group number Bak, copies a FlexE map to obtain a FlexE map Bak, and copies a FlexE instance number to obtain a FlexE instance number Bak.

Figure 12:
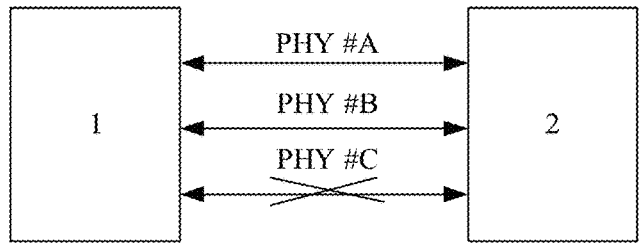
FIG. 12 is a schematic diagram of a structure of a flexible Ethernet group management system according to an embodiment of the present disclosure.

After the device 1 and the device 2 synchronously adjust the FlexE group, GR, GA, and G are switched back to 0, to ensure that an initial state of the FlexE group is a default state each time the FlexE group is adjusted. In other words, GR, GA, and G remain consistent during normal running, and vary only when the FlexE group is adjusted. The FlexE group number Bak of the PHY #A/B may also be changed. For example, when GR=1, the FlexE group number Bak corresponding to the PHY #A/B/C is changed to Y. A plurality of PHYs can be added to a FlexE group together. The method is the same, and Then, with reference to a system shown in FIG. 12, the flexible Ethernet group management method provided in embodiments of the present disclosure is described by using an example in which the first network device is referred to as a device 1, the second network device is referred to as a device 2, and the device 1 initiates a group change to remove a PHY #C from a FlexE group X including a PHY #A, a PHY #B, and the PHY #C. Before the PHY #C is deleted from the FlexE group X, whether total traffic of current client service flows can be supported by the PHY #A and the PHY #B is determined. If a total bandwidth of the PHY #A and the PHY #B is less than the total traffic of the client service flows, an alarm is reported to notify a user that the adjustment (deleting the PHY #C from the group X) may affect the service flows. If the PHY #A and the PHY #B can support the total traffic of the client service flows, calendar switching is first performed to place all client service flows to the PHY #A and the PHY #B.

Figure 13:
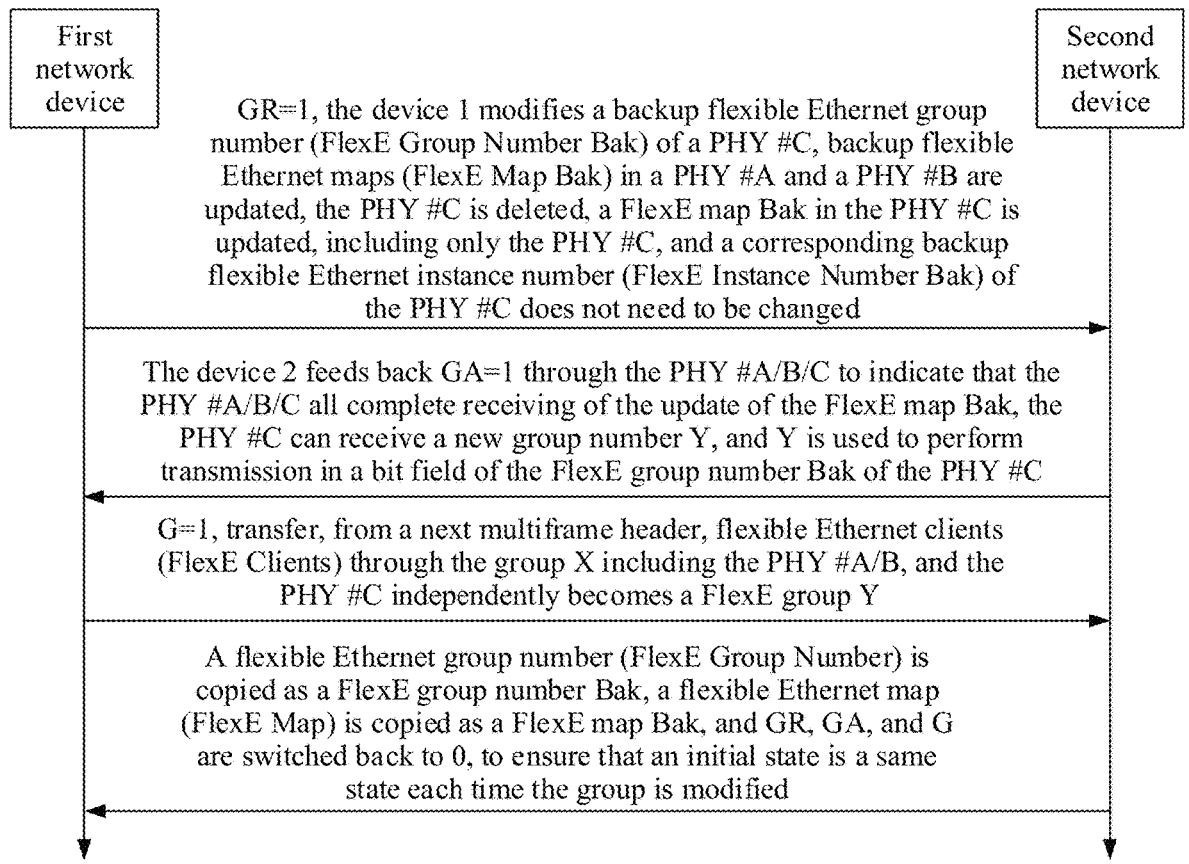
FIG. 13 is a flowchart of a flexible Ethernet group management method according to an embodiment of the present disclosure.

After the foregoing steps are completed, the FlexE group is to be adjusted. Steps are shown in FIG. 13. After deletion, a FlexE group number of a FlexE group including the PHY #A and the PHY #B may be changed. For example, the FlexE group number is changed to Z. Z!=Y, that is, Z is not equal to Y. As shown in FIG. 13, the method includes but is not limited to the following steps.

Step 1: GR=1, and the device 1 modifies a FlexE group number Bak of the PHY #C, and updates a FlexE map Bak in the PHY #A and the PHY #B, to delete information about the PHY #C from the FlexE map Bak. In addition, a FlexE map Bak in the PHY #C is updated. After the updating, the FlexE map Bak in the PHY #C includes only the PHY #C. A corresponding FlexE instance number Bak of the PHY #C does not need to be changed.

Step 2: The device 2 feeds back GA=1 through the PHY #A/B/C to indicate that the PHY #A/B/C all complete receiving of the update of the FlexE map Bak, and the PHY #C can receive a new group number Y. Y is used to perform transmission in a bit field of the FlexE group number Bak of the PHY #C.

Step 3: G=1, and the device 1 and the device 2 transfer, from a next multiframe header, FlexE client service flows through the FlexE group X including the PHY #A/B. The PHY #C independently becomes a FlexE group Y.

Step 4: The device 2 copies a FlexE group number to obtain a FlexE group number Bak, and copies a FlexE map to obtain a FlexE map Bak.

After the device 1 and the device 2 synchronously adjust the FlexE group, GR, GA, and G are switched back to 0, to ensure that an initial state is a same state each time the FlexE group is adjusted. In other words, GR, GA, and G remain consistent during normal running, and vary only when the FlexE group is adjusted. In addition, it should be noted that, in a switching process, a FlexE instance number in each PHY does not need to be changed, or may be modified as required. This is not limited in embodiments of the present disclosure.

Figure 14:
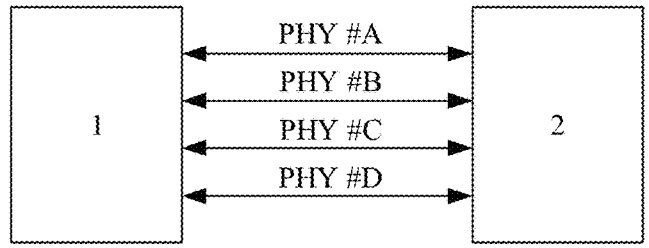
FIG. 14 is a schematic diagram of a structure of a flexible Ethernet group management system according to an embodiment of the present disclosure.

A system shown in FIG. 14 is used as an example. The first network device is referred to as a device 1, and the second network device is referred to as a device 2. The device 1 initiates a FlexE group change, to divide a FlexE group X including a PHY #A, a PHY #B, a PHY #C, and a PHY #D into a FlexE group Y including the PHY #A and the PHY #B, and a FlexE group Z including the PHY #C and the PHY #D. With reference to FIG. 13, the division operation is similar to the operation of deleting a PHY.

Figure 15:
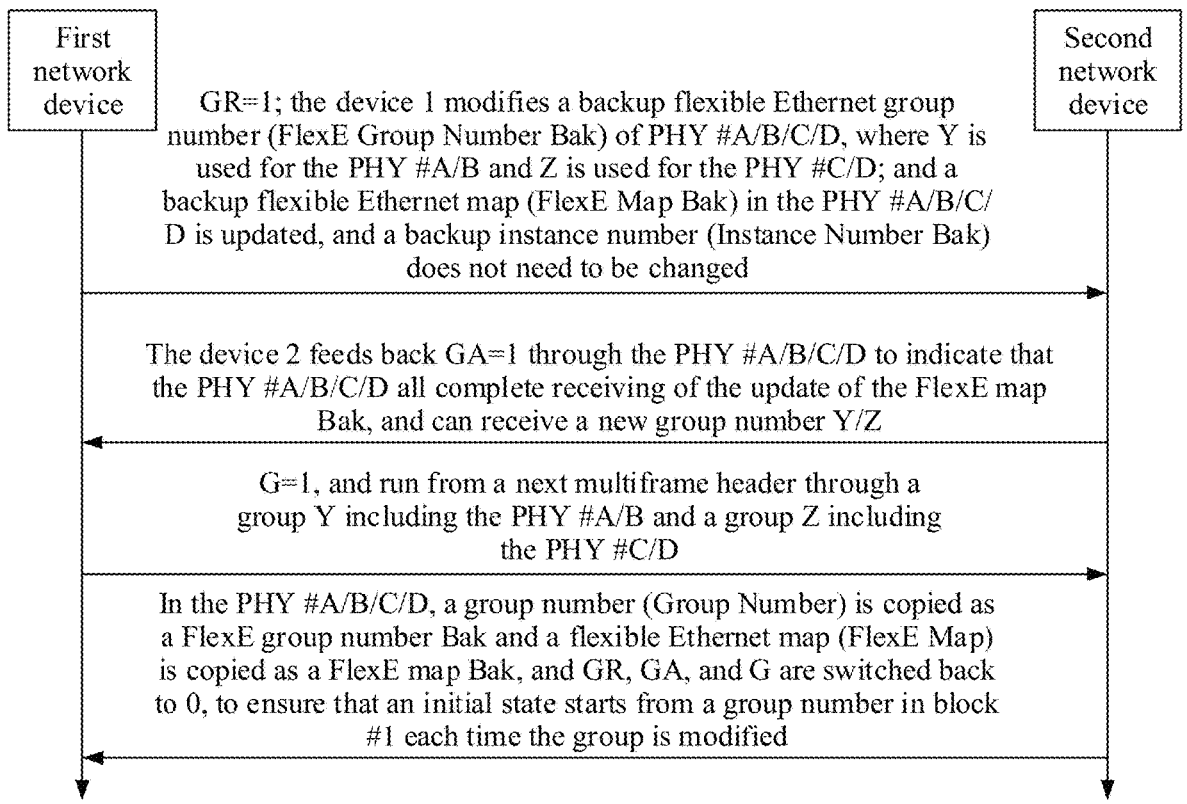
FIG. 15 is a flowchart of a flexible Ethernet group management method according to an embodiment of the present disclosure.

Before division, whether FlexE group division can be completed without affecting client service flows is predetermined. For example, it is assumed that a PHY rate is 100G. If client service flows can be divided into two parts and each part can be accommodated in a 2×100G bandwidth, lossless division can be performed. Otherwise, an alarm is reported. As shown in FIG. 15, the operation process includes but is not limited to the following several steps.

Step 1: GR=1, and the device 1 modifies a FlexE group number Bak of the PHY #A/B/C/D. Y is used as the FlexE group number Bak of the PHY #A/B, and Z is used as the FlexE group number Bak of the PHY #C/D. Therefore, the PHY #A/B form a FlexE group, and the PHY #C/D form a FlexE group. In addition, a FlexE map Bak in the PHY #A/B/C/D is updated. For example, the FlexE map Bak of the PHY #A/B include information about the PHY #A/B, and the FlexE map Bak of the PHY #C/D include information about the PHY #C/D. An instance number Bak in the PHY #A/B/C/D does not need to be changed.

Step 2: The device 2 feeds back GA=1 through the PHY #A/B/C/D to indicate that the PHY #A/B/C/D all complete receiving of the update of the FlexE map Bak, and can receive the new group number Y/Z.

Step 3: G=1, and the device 1 and the device 2 transfer, from a next multiframe header, corresponding FlexE client service flows through the FlexE group Y including the PHY #A/B and the FlexE group Z including the PHY #C/D.

Step 4: In the PHY #A/B/C/D, a group number is copied as a FlexE group number Bak, and a FlexE map is copied as a FlexE map Bak.

After the device 1 and the device 2 synchronously adjust the FlexE group, GR, GA, and G are switched back to 0, to ensure that an initial state starts from a group number in block #1 each time the FlexE group is adjusted. In other words, GR, GA, and G remain consistent during normal running, and vary only when the FlexE group is adjusted.

In addition to using a reserved bit in an overhead block to carry the configuration information of the target flexible Ethernet group to be adjusted, in an example embodiment, the configuration information of the FlexE group to be adjusted may alternatively be negotiated through a management channel because there is a management channel in a FlexE overhead frame. The management channel is shown by block #4 to block #8 in FIG. 3 or FIG. 4. The management channel may carry a plurality of protocols. For example, the management channel carries an Ethernet packet, and the configuration information of the FlexE group is negotiated through the Ethernet packet.

A 128-byte packet is defined. A payload bit field is 46+64=110 bytes, including:
 (1) 20-bit current FlexE group number (optional);
 (2) 20-bit new FlexE group number (which can be the same as the original FlexE group number);
 (3) 56 bits indicating a FlexE map bit field;
 (4) 96-bit switching time point (a PTP timestamp may be used as a reference); and
 (5) at least two bits indicating GR/GA information.

Figure 16:
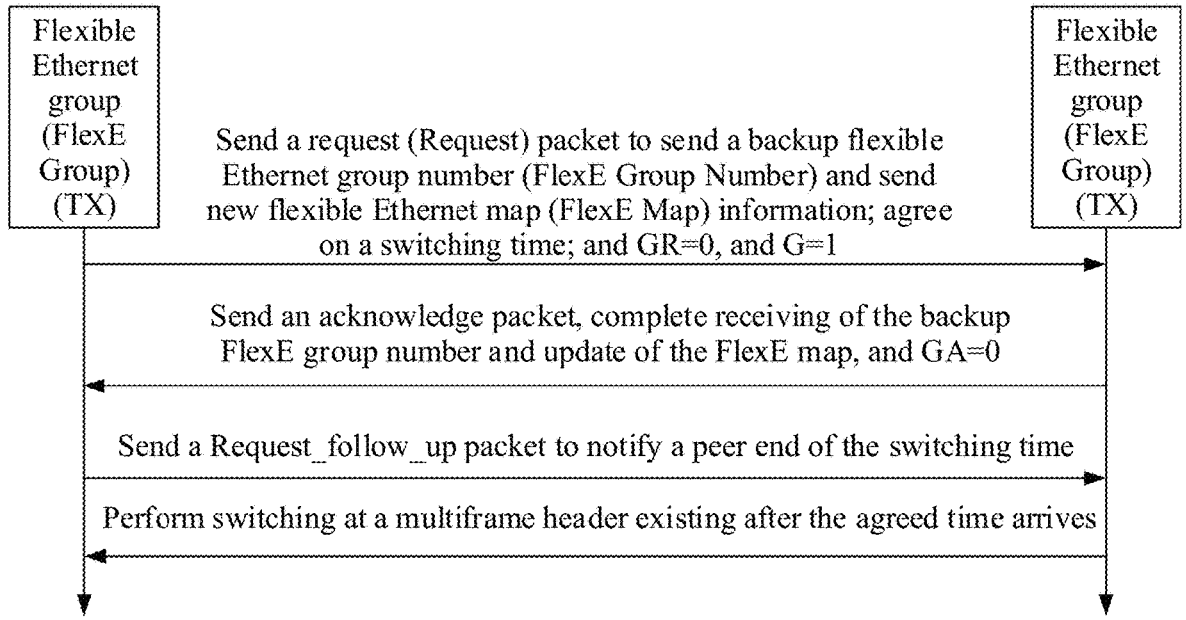
FIG. 16 is a flowchart of a flexible Ethernet group management method according to an embodiment of the present disclosure.

In a manner of using the management channel to carry the configuration information of the target flexible Ethernet group to be adjusted, the 3-bit GGG shown in FIG. 6 or FIG. 7 may not be needed to indicate whether to perform switching. However, this is not limited in embodiments of the present disclosure, the 3-bit GGG solution is not excluded. As shown in FIG. 16, the process of negotiating configuration information in the embodiments includes but is not limited to the following steps:

Step 1: A TX in the FlexE group sends a request packet to an RX, to send a backup FlexE group number through the request packet, and send new FlexE map information. In addition, the TX and the RX agree on a switching time point, that is, agree on a time for synchronously adjusting the FlexE group. GR=0, and G=1.

Step 2: The RX sends an acknowledge packet to the TX, and completes receiving of the backup FlexE group number and update of the FlexE map. GA=0.

Step 3: The device 1 sends a Request follow up packet to the device 2, to notify a peer end of a time to perform switching, that is, a time to adjust the FlexE group to be adjusted.

Step 4: Perform switching at a multiframe header existing after the agreed time arrives.

The agreed switching time point is bounded by an overhead frame header or an overhead multiframe header. If the time point does not match the boundary, the time point is postponed to the next boundary. In addition, as shown in FIG. 16, the adjustment to the FlexE group includes but is not limited to one or more of the following adjustment manners: adding a new physical layer link to the target flexible Ethernet group to be adjusted, deleting an existing physical layer link in the target flexible Ethernet group to be adjusted, and dividing the target flexible Ethernet group to be adjusted. For each adjustment manner, refer to the foregoing corresponding embodiments. An adjustment process in a manner in which the management channel is used to negotiate the configuration information of the target flexible Ethernet group is not limited in embodiments of the present disclosure. Compared with a manner in which the configuration information of the target flexible Ethernet group is carried in reserved bit fields in an overhead block, an advantage of this solution is that the reserved bit fields in the overhead block do not need to be used. Compared with the reserved bit fields of the overhead block, bandwidth resources of the management channel are more abundant.

In addition to the foregoing several instances, the method provided in embodiments of the present disclosure further supports configuring two ends by using a management system/SDN controller, to perform synchronous switching. The first network device is a device 1, and the second network device is a device 2. An upper-layer controller separately contacts with management interfaces of the device 1 and the device 2 through upper-layer management, to deliver FlexE group information to be adapted. In other words, the upper-layer controller delivers configuration information of a target flexible Ethernet group to be adjusted to the device 1 and the device 2. The method provided in embodiments of the present disclosure is described by using an example in which the configuration information includes but is not limited to a new FlexE group number, a new FlexE map, and the like.

Figure 17:
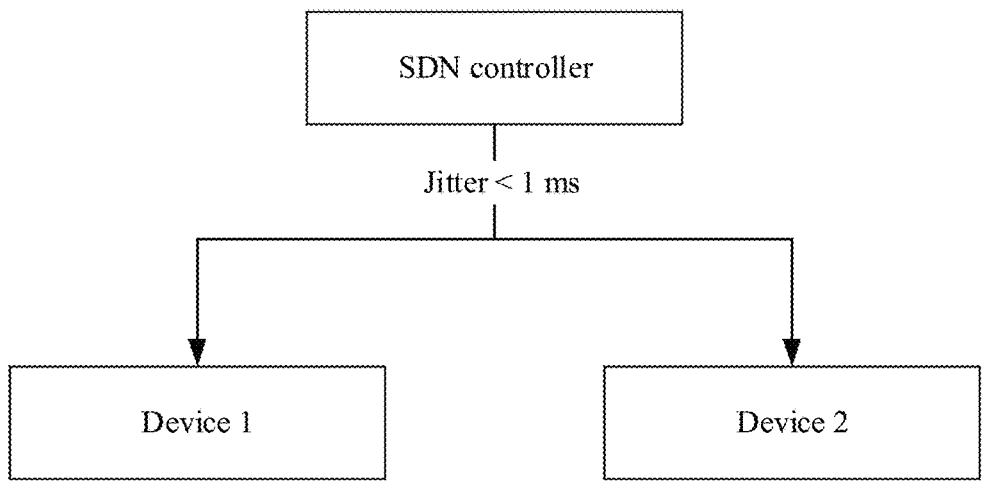
FIG. 17 is a schematic diagram of a structure of a flexible Ethernet group management system according to an embodiment of the present disclosure.

As shown in FIG. 17, this solution may be used together with the embodiment shown in FIG. 11, FIG. 13, FIG. 15, or FIG. 16. For example, with reference to the embodiment shown in FIG. 11, FIG. 13, or FIG. 15, after the SDN controller delivers the configuration and confirms a success, two ends are indicated to simultaneously perform G-bit switching. In other words, the device 1 and the device 2 synchronously perform group adjustment. For example, with reference to the embodiment shown in FIG. 16, after the configuration is delivered in a form of a management channel carrying a packet and a success is confirmed, switching may be performed by sending a switching timestamp.

Figure 11:
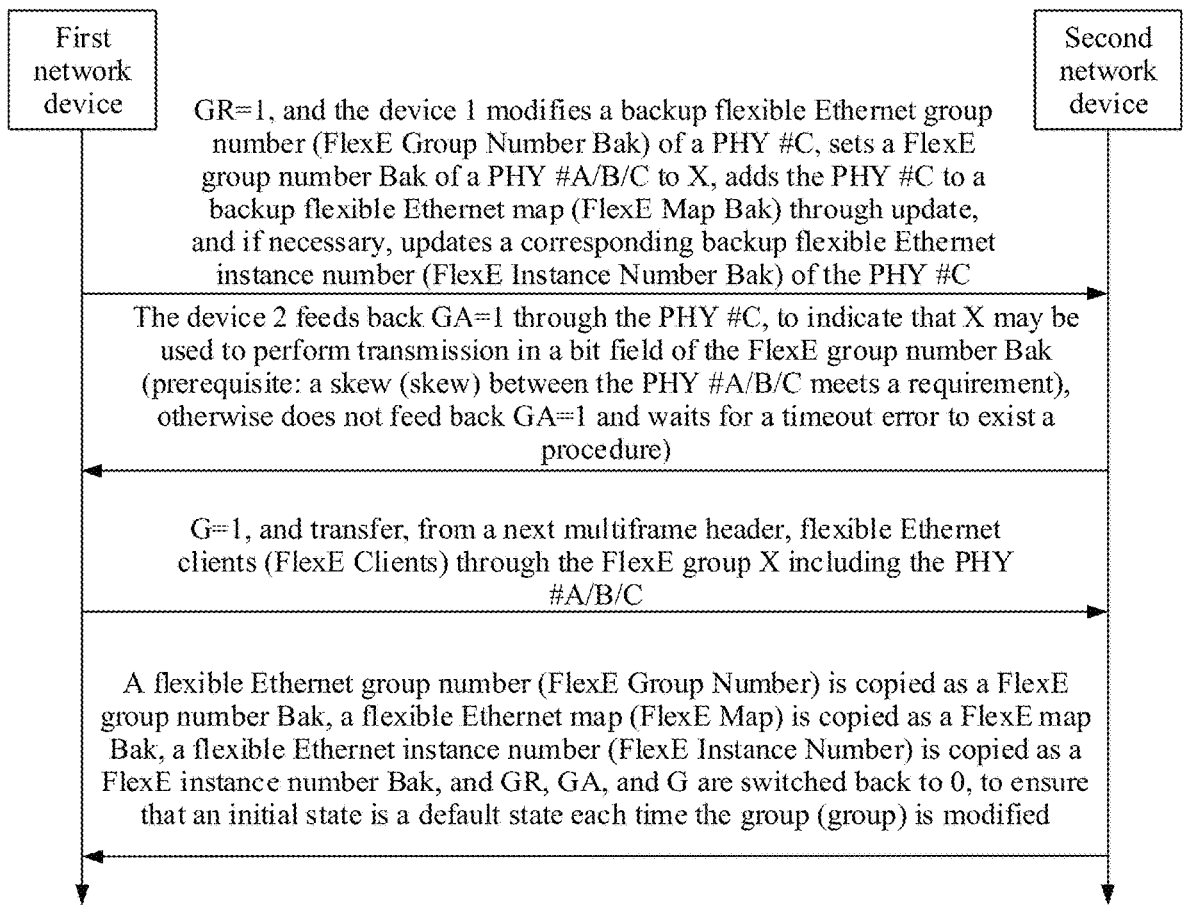
FIG. 11 is a flowchart of a flexible Ethernet group management method according to an embodiment of the present disclosure.

In addition, in the solution shown in FIG. 17, in addition to implementing flexible Ethernet group management with reference to the embodiment shown in FIG. 11, FIG. 13, or FIG. 15, or implementing flexible Ethernet group management with reference to the embodiment shown in FIG. 16, the solution shown in FIG. 17 may alternatively be used independently. An alarm mechanism overriding the two devices may be used to perform forcible switching.

Figure 18:
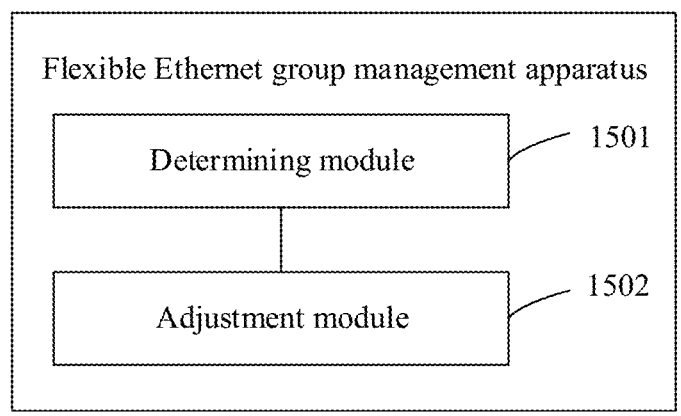
FIG. 18 is a schematic diagram of a structure of a flexible Ethernet group management apparatus according to an embodiment of the present disclosure.

As shown in FIG. 18, a flexible Ethernet group management apparatus is provided. The apparatus is used in a first network device, and the apparatus includes: a determining module 1501 configured to determine configuration information of a target flexible Ethernet group to be adjusted, where the configuration information of the target flexible Ethernet group includes a backup flexible Ethernet group number and a backup flexible Ethernet map of the target flexible Ethernet group, and the backup flexible Ethernet map includes information about a physical layer link in the target flexible Ethernet group; and an adjustment module 1502 configured to adjust the target flexible Ethernet group synchronously with a second network device based on the configuration information of the target flexible Ethernet group, where the second network device communicates with the first network device through the physical layer link in the target flexible Ethernet group.

In an example embodiment, the determining module 1501 is configured to negotiate, with the second network device through an overhead block, the configuration information of the target flexible Ethernet group to be adjusted. The overhead block carries the configuration information of the target flexible Ethernet group.

In an example embodiment, a reserved bit field of the overhead block carries the configuration information of the target flexible Ethernet group, or a management channel field of the overhead block carries the configuration information of the target flexible Ethernet group.

In an example embodiment, the determining module 1501 is configured to receive the configuration information that is sent by a controller to the first network device and the second network device and that is of the target flexible Ethernet group to be adjusted.

In an example embodiment, the determining module 1501 is further configured to: when a new physical layer link is added to the target flexible Ethernet group, if the backup flexible Ethernet map includes information about the new physical layer link, determine that the new physical layer link is valid.

The adjustment module 1502 is configured to: in response to a fact that the new physical layer link is valid, perform the operation of adjusting the target flexible Ethernet group synchronously with the second network device based on the configuration information of the target flexible Ethernet group.

In an example embodiment, that the new physical layer link is valid means that the following conditions are met: the new physical layer link is an independent physical layer link, the new physical layer link does not conflict with an existing physical layer link in the target flexible Ethernet group, and the new physical layer link can be aligned with a phase of an existing physical layer link in the target flexible Ethernet group.

In an example embodiment, the determining module 1501 is further configured to: when a target physical layer link in the target flexible Ethernet group is deleted, if the backup flexible Ethernet map does not include information about the target physical layer link, determine that a target flexible Ethernet group obtained after the target physical layer link is deleted can support current traffic.

The adjustment module 1502 is configured to: in response to a fact that the target flexible Ethernet group obtained after the target physical layer link is deleted can support the current traffic, perform the operation of adjusting the target flexible Ethernet group synchronously with the second network device based on the configuration information of the target flexible Ethernet group.

In an example embodiment, the determining module 1501 is further configured to: when physical layer links in the target flexible Ethernet group need to be regrouped, if the backup flexible Ethernet group number includes a group number of a regrouped flexible Ethernet group and the backup flexible Ethernet map includes information about a regrouped physical layer link, determine that the regrouped flexible Ethernet group can support a corresponding service flow.

The adjustment module 1502 is configured to: in response to a fact that the regrouped flexible Ethernet group can support the corresponding service flow, perform the operation of adjusting the target flexible Ethernet group synchronously with the second network device based on the configuration information of the target flexible Ethernet group.

In an example embodiment, the adjustment module 1502 is configured to: negotiate an adjustment time with the second network device, and when the adjustment time arrives, adjust the target flexible Ethernet group synchronously with the second network device based on the configuration information of the target flexible Ethernet group.

Figure 19:
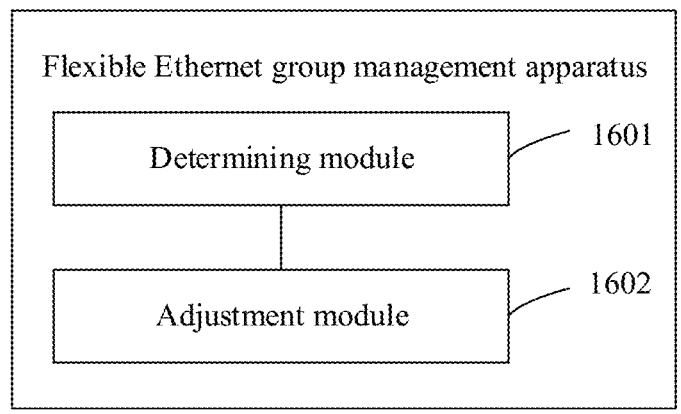
FIG. 19 is a schematic diagram of a structure of a flexible Ethernet group management apparatus according to an embodiment of the present disclosure.

As shown in FIG. 19, a flexible Ethernet group management apparatus is provided. The apparatus is used in a second network device, and the apparatus includes: a determining module 1601 configured to determine configuration information of a target flexible Ethernet group to be adjusted, where the configuration information of the target flexible Ethernet group includes a backup flexible Ethernet group number and a backup flexible Ethernet map of the target flexible Ethernet group, and the backup flexible Ethernet map includes information about a physical layer link in the target flexible Ethernet group; and an adjustment module 1602 configured to adjust the target flexible Ethernet group synchronously with a first network device based on the configuration information of the target flexible Ethernet group, where the first network device communicates with the second network device through the physical layer link in the target flexible Ethernet group.

In an example embodiment, the determining module 1601 is configured to negotiate, with the first network device through an overhead block, the configuration information of the target flexible Ethernet group to be adjusted. The overhead block carries the configuration information of the target flexible Ethernet group.

In an example embodiment, a reserved bit field of the overhead block carries the configuration information of the target flexible Ethernet group, or a management channel field of the overhead block carries the configuration information of the target flexible Ethernet group.

In an example embodiment, the determining module 1601 is configured to receive the configuration information that is sent by a controller to the second network device and the first network device and that is of the target flexible Ethernet group to be adjusted.

In an example embodiment, the adjustment module 1602 is configured to: negotiate an adjustment time with the first network device, and when the adjustment time arrives, adjust the target flexible Ethernet group synchronously with the first network device based on the configuration information of the target flexible Ethernet group.

It should be understood that, when the apparatuses provided in FIG. 18 and FIG. 19 implement functions of the apparatuses, division into the foregoing functional modules is merely used as an example for description. In actual application, the foregoing functions may be allocated to different functional modules for implementation based on a requirement. In other words, an internal structure of a device is divided into different functional modules, to implement all or some of the functions described above. In addition, the apparatuses provided in the foregoing embodiments and the method embodiments pertain to a same concept. For a specific implementation process thereof, refer to the method embodiments.

Figure 20:
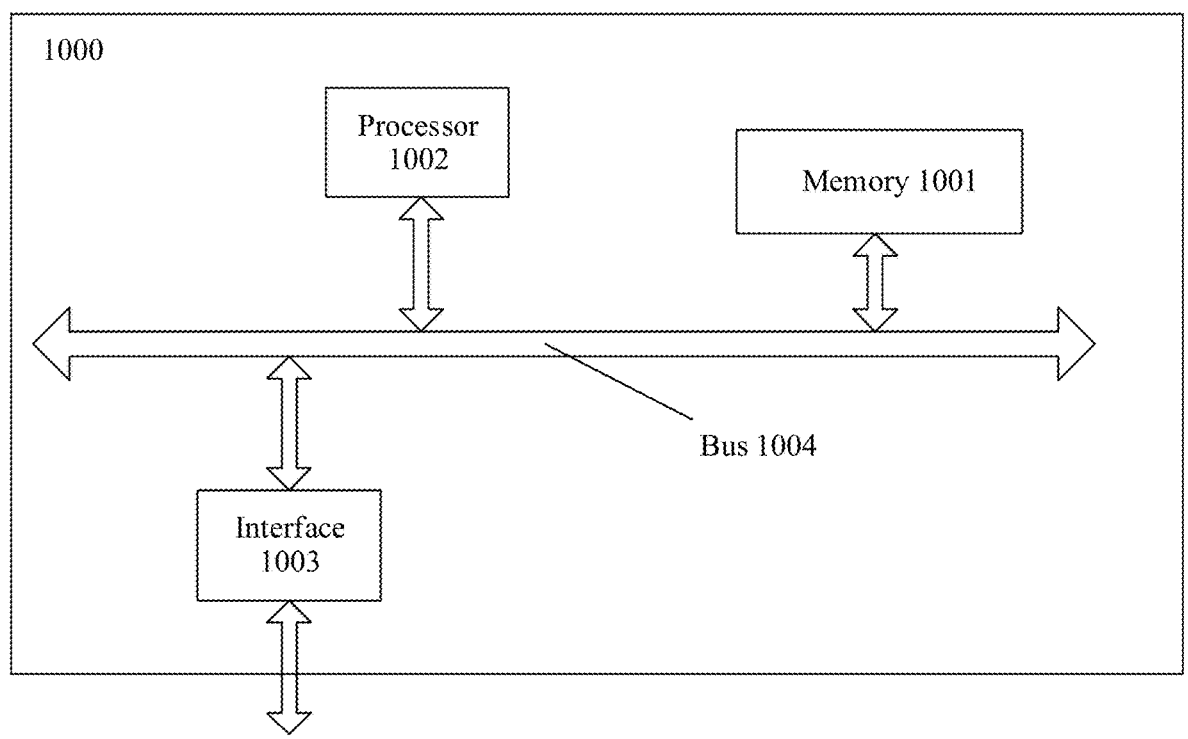
FIG. 20 is a schematic diagram of a structure of a flexible Ethernet group management device according to an embodiment of the present disclosure.

As shown in FIG. 20, an embodiment of the present disclosure further provides a flexible Ethernet group management device 1000. The flexible Ethernet group management device 1000 shown in FIG. 20 is configured to perform operations related to the foregoing flexible Ethernet group management method. The flexible Ethernet group management device 1000 includes a memory 1001, a processor 1002, and an interface 1003. The memory 1001, the processor 1002, and the interface 1003 are connected through a bus 1004.

The memory 1001 stores a computer program or at least one instruction, and the computer program or the at least one instruction is loaded and executed by the processor 1002, to implement any one of the foregoing flexible Ethernet group management methods.

The interface 1003 is configured to communicate with another device in a network. The interface 1003 may implement communication in a wireless or wired manner. For example, the interface 1003 may be a network adapter. For example, the flexible Ethernet group management device 1000 may communicate with a server through the interface 1003.

For example, the network device shown in FIG. 20 is the first network device in FIG. 5 and FIG. 10 to FIG. 17, and the processor 1002 reads the computer program or the instruction in the memory 1001, so that the network device shown in FIG. 20 can perform all or some operations performed by the first network device.

For another example, the network device shown in FIG. 20 is the second network device in FIG. 5 and FIG. 10 to FIG. 17, and the processor 1002 reads the computer program or the instruction in the memory 1001, so that the network device shown in FIG. 20 can perform all or some operations performed by the second network device.

It should be understood that FIG. 20 shows only a simplified design of the flexible Ethernet group management device 1000. In actual application, the flexible Ethernet group management device 1000 may include any quantity of interfaces, processors, or memories. In addition, the processor may be a central processing unit (CPU), or may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, any conventional processor, or the like. It should be noted that the processor may be a processor that supports an advanced reduced instruction set computer machine (ARM) architecture.

Further, in an optional embodiment, the memory may include a read-only memory and a random access memory, and provide a computer program/instruction and data for the processor. The memory may alternatively include a non-volatile random access memory. For example, the memory may further store information about a device type.

The memory may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. By way of example but not limitation, many forms of RAMs are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

A flexible Ethernet group management system is further provided. The system includes a first network device and a second network device.

The first network device is configured to perform the method performed by the first network device in any one of FIG. 5 and FIG. 10 to FIG. 17, and the second network device is configured to perform the method performed by the second network device in any one of FIG. 5 and FIG. 10 to FIG. 17.

A computer-readable storage medium is further provided, and the storage medium stores a computer program or at least one instruction. The computer program or the instruction is loaded and executed by a processor, to implement any one of the foregoing flexible Ethernet group management methods.

The present disclosure provides a computer program. When the computer program is executed by a computer, a processor or the computer may be enabled to perform corresponding operations and/or procedures in the foregoing method embodiments.

All or some of foregoing embodiments may be implemented by using software, hardware, firmware, or any combination thereof. When software is used to implement the embodiments, the embodiments may be all or partially implemented in a form of a computer program product. The computer program product includes one or more computer instructions. When the computer program instructions are loaded and executed on the computer, all or some of the procedures or functions in the present disclosure are generated. The computer may be a general-purpose computer, a dedicated computer, a computer network, or another programmable apparatus. The computer instructions may be stored in the computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

The foregoing descriptions are merely embodiments of the present disclosure, but are not intended to limit the present disclosure. Any modification, equivalent replacement, or improvement made without departing from the spirit and principle of the present disclosure should fall within the protection scope of this application.

What is claimed is:

1. A method implemented by a first network device, the method comprising:
   determining configuration information of a target Flexible Ethernet (FlexE) group, wherein the configuration information comprises a backup FlexE group number and a backup FlexE map comprising information about a physical layer link in the target FlexE group;
   communicating with a second network device through the physical layer link; and
   synchronously adjusting the target FlexE group with the second network device based on the configuration information.

2. The method according to claim 1, wherein the determining the configuration information comprises negotiating the configuration information with the second network device through an overhead block comprising the configuration information.

3. The method according to claim 2, wherein the overhead block comprises a reserved bit field comprising the configuration information.

4. The method according to claim 2, wherein the overhead block comprises a management channel field comprising the configuration information.

5. The method according to claim 1, further comprising receiving the configuration information from a controller.

6. The method according to claim 5, further comprising synchronously adjusting the target FlexE group with the second network device based on first configuration information of a first target FlexE group comprising a new physical layer link to be added to the target FlexE group, and wherein the backup FlexE map comprises information about the new physical layer link.

7. The method according to claim 6, wherein that the new physical layer link meets the following conditions:
   the new physical layer link is an independent physical layer link;
   the new physical layer link does not conflict with an existing physical layer link in the target flexible Ethernet group; and
   the new physical layer link can be aligned with a phase of an existing physical layer link in the target flexible Ethernet group.

8. The method according to claim 1, further comprising synchronously adjusting the target FlexE group with the second network device based on configuration information of a second target FlexE group to delete a target physical layer link in the target FlexE group, wherein the second target FlexE group lacks the target physical layer link and can support current traffic, and wherein the backup FlexE map is devoid of information about the target physical layer link.

9. The method according to claim 1, further comprising:
   synchronously adjusting the target FlexE group with the second network device based on configuration information of a regrouped target flexible Ethernet group to regroup physical layer links in the target FlexE group, wherein the backup FlexE group number comprises a group number of a regrouped FlexE group, and wherein the backup FlexE map comprises information about a regrouped physical layer link.

10. The method according to claim 9, wherein the synchronously adjusting the target FlexE group with the second network device based on the configuration information comprises:
    negotiating an adjustment time with the second network device; and
    synchronously adjusting, when the adjustment time arrives, the target FlexE group with the second network device based on the configuration information.

11. An apparatus comprising:
    a memory configured to store a program; and
    a processor coupled to the memory and configured to execute the program to cause the apparatus to:
       determine configuration information of a target Flexible Ethernet (FlexE) group, wherein the configuration information comprises a backup FlexE group number and a backup FlexE map comprising information about a physical layer link in the target FlexE group;

communicate with a second network device through the physical layer link; and synchronously adjust the target FlexE group with the second network device based on the configuration information.

12. The apparatus according to claim 11, wherein the processor is further configured to execute the program to cause the apparatus to negotiate the configuration information with the second network device through an overhead block comprising the configuration information.

13. The apparatus according to claim 12, wherein the overhead block comprises a reserved bit field comprising the configuration information.

14. The apparatus according to claim 12, wherein the overhead block comprises a management channel field comprising the configuration information.

15. The apparatus according to claim 11, wherein the processor is further configured to execute the program to cause the apparatus to receive the configuration information from a controller.

16. The apparatus according to claim 11, wherein the processor is further configured to execute the program to cause the apparatus to synchronously adjust the target FlexE group with the second network device based on configuration information of a first target FlexE group comprising a new physical layer link to be added to the target FlexE group, and wherein the backup FlexE map comprises information about the new physical layer link.

17. The apparatus according to claim 16, wherein the new physical layer link meets the following conditions:

the new physical layer link is an independent physical layer link, the new physical layer link does not conflict with an existing physical layer link in the target FlexE group, and the new physical layer link can be aligned with a phase of an existing physical layer link in the target FlexE group.

18. The apparatus according to claim 11, wherein the processor is further configured to execute the program to cause the apparatus to synchronously adjust the target FlexE group with the second network device based on configuration information of a second target FlexE group to delete a target physical layer link in the target FlexE group, wherein the second target FlexE group lacks the physical layer link, and wherein the backup FlexE map is devoid of information about the target physical layer link.

19. The apparatus according to claim 11, wherein the processor is further configured to execute a program to cause the apparatus to synchronously adjust the target FlexE group with the second network device based on third configuration information of a regrouped target FlexE group to regroup physical layer links in the target FlexE group, wherein the backup FlexE group number comprises a group number of a regrouped FlexE group and the backup FlexE map comprises information about a regrouped physical layer link.

20. The apparatus according to claim 11, wherein the processor is further configured to execute a program to cause the apparatus to:

negotiate an adjustment time with the second network device; and synchronously adjust, when the adjustment time arrives, the target FlexE group with the second network device based on the configuration information of the target FlexE group.

* * * * *